United States Patent
Baxter et al.

(10) Patent No.: US 10,465,984 B2
(45) Date of Patent: Nov. 5, 2019

(54) CIRCULATING FLUIDIZED BED CONNECTED TO A DESUBLIMATING HEAT EXCHANGER

(71) Applicants: Larry Baxter, Orem, UT (US); Andrew Baxter, Spanish Fork, UT (US); Eric Mansfield, Spanish Fork, UT (US); Aaron Sayre, Spanish Fork, UT (US); Kyler Stitt, Lindon, UT (US); Christopher Hoeger, Provo, UT (US); Stephanie Burt, Provo, UT (US); David Frankman, Provo, UT (US)

(72) Inventors: Larry Baxter, Orem, UT (US); Andrew Baxter, Spanish Fork, UT (US); Eric Mansfield, Spanish Fork, UT (US); Aaron Sayre, Spanish Fork, UT (US); Kyler Stitt, Lindon, UT (US); Christopher Hoeger, Provo, UT (US); Stephanie Burt, Provo, UT (US); David Frankman, Provo, UT (US)

(73) Assignee: Hall Labs LLC, Provo, UT (US)

( * ) Notice: Subject to any disclaimer, the term of this patent is extended or adjusted under 35 U.S.C. 154(b) by 356 days.

(21) Appl. No.: 15/412,484

(22) Filed: Jan. 23, 2017

(65) Prior Publication Data
US 2018/0209729 A1 Jul. 26, 2018

(51) Int. Cl.
*F25J 3/06* (2006.01)
*B01D 53/00* (2006.01)

(52) U.S. Cl.
CPC ............ *F25J 3/067* (2013.01); *B01D 53/002* (2013.01); *B01D 2257/504* (2013.01); *B01D 2258/0283* (2013.01); *F25J 2205/10* (2013.01); *F25J 2205/20* (2013.01); *F25J 2205/30* (2013.01); *F25J 2270/04* (2013.01); *F25J 2270/90* (2013.01); *Y02C 10/12* (2013.01)

(58) Field of Classification Search
CPC ...... F25J 3/067; F25J 2270/90; F25J 2270/04; F25J 2205/10; F25J 2205/20; F25J 2205/30; Y02C 10/12; B01J 8/24; B01D 53/002
See application file for complete search history.

(56) References Cited

U.S. PATENT DOCUMENTS

| | | | | |
|---|---|---|---|---|
| 3,776,150 A | * | 12/1973 | Evans ..................... | B01J 8/002 110/245 |
| 3,779,181 A | * | 12/1973 | Staffin .................... | B01J 8/002 110/228 |
| 3,882,798 A | * | 5/1975 | Reese ..................... | B01J 8/24 110/245 |
| 4,177,742 A | * | 12/1979 | Uemura ................... | B01J 8/003 110/245 |
| 4,621,952 A | * | 11/1986 | Aronson .................. | B01J 3/02 406/124 |

(Continued)

*Primary Examiner* — Kun Kai Ma

(57) ABSTRACT

Condensable vapors such as carbon dioxide are separated from light gases in a process stream. The systems and methods employ a circulating fluidized particle bed cooled by an out-bed heat exchanger to desublimate the solid form of condensable vapors from the process stream. Gas and solids may be sorted in a separator, and the solids may then be subcooled in a heat exchanger. The condensable vapors may be condensed on the bed particles or in the heat exchanger while the light gases from the process stream, which are not condensed, form a separated light-gas stream.

20 Claims, 13 Drawing Sheets

(56) References Cited

U.S. PATENT DOCUMENTS

| | | | | |
|---|---|---|---|---|
| 4,769,054 A * | 9/1988 | Steigman | B01D 8/00 62/54.1 |
| 4,966,101 A * | 10/1990 | Maeda | B01J 8/1827 110/245 |
| 8,715,401 B2 * | 5/2014 | Baxter | B01D 7/02 96/150 |
| 2007/0224109 A1 * | 9/2007 | Chaifetz | C01B 9/02 423/491 |
| 2009/0123540 A1 * | 5/2009 | Pipkin | A61K 9/205 424/468 |
| 2010/0111804 A1 * | 5/2010 | Lord | B01J 8/1827 423/342 |
| 2012/0132072 A1 * | 5/2012 | Baxter | B01D 7/02 95/108 |
| 2012/0153514 A1 * | 6/2012 | Baxter | B01D 7/02 261/128 |
| 2013/0139543 A1 * | 6/2013 | Baxter | F25J 3/067 62/611 |
| 2018/0209729 A1 * | 7/2018 | Baxter | F25J 3/067 |

\* cited by examiner

Gas with condensable carbon dioxide

CIRCULATING FLUIDIZED BED CONNECTED TO A DESUBLIMATING HEAT EXCHANGER

This invention was made with government support under DE-FE0028697 awarded by The Department of Energy. The government has certain rights in the invention.

TECHNICAL FIELD

The present invention relates to methods and systems for separating desublimating vapors (e.g., carbon dioxide) from gases by desublimating the vapors on a bed of particles.

BACKGROUND

The separation of condensable gases, such as carbon dioxide, from other light gases is an important part of gas preparation and purification. For example, the flue gases of a conventional power station typically contain from about 4% (by volume) to about 16% carbon dioxide ($CO_2$). $CO_2$ may represent a significant contributor to climate change. Therefore, there is a clear need for efficient methods of capturing $CO_2$ from flue gases so as to produce a concentrated stream of $CO_2$ that may readily be transported to a safe storage site or to a further application. Similarly, $CO_2$ must be separated from natural gas, syngas and producer gas from gasification or reforming, breathable air, and air inlet for air separation units. Other condensable gases such as water must be separated from air, chemical streams, natural gas, and most of the streams cited earlier. Other condensable gases that must be separated from process streams include natural gas liquids, pollutants such as $NO_x$, $SO_x$, Hg, $O_3$, impurities, contaminants, pollutants, odorous gases, and air toxics. The immediate interest of the inventors is $CO_2$, but the disclosure described here has obvious applications to other gas separation systems.

$CO_2$ has been or is planned to be captured from gas streams by five main technologies: absorption, where $CO_2$ is selectively absorbed into liquid solvents; adsorption or chemical looping, where $CO_2$ is separated by adsorption or reaction on the surfaces of specially designed solid particles which may or may not be induced to release the $CO_2$ into substantially pure streams later in the process; membranes, where $CO_2$ is separated by semi-permeable plastics or ceramic membranes; oxyfiring, where oxygen is separated from air prior to combustion, producing a substantially pure $CO_2$ effluent; and, low temperature/high pressure processes, where the separation is achieved by condensing the $CO_2$.

The currently most well-established and therefore economical proven technique to capture $CO_2$ from a flue gas is to scrub the flue gas with an amine solution to absorb $CO_2$ to the solution. This technology has reached the commercial state of operation for $CO_2$ capture systems from small scale flue gases and from specialty processes. However, its application decreases considerably the total efficiency of the power plant.

Another type of process that has received significant attention is the oxy-combustion systems, which uses oxygen, usually produced in an air separation unit (ASU) but sometimes in membrane separation units, instead of air, for the combustion of the primary fuel. The oxygen is often mixed with an inert gas, such as recirculated flue gas, to keep the combustion temperature and heat absorption at a suitable level. Oxy-combustion processes produce flue gas having $CO_2$, water and O2 as its main constituents; the $CO_2$ concentration being typically greater than about 70% by volume. Treatment of the flue gas is often needed to remove air pollutants and non-condensed gases (such as nitrogen) from the flue gas before the $CO_2$ is sent to storage.

Additionally, a fluidized bed typically has a cooling surface and particles located inside of the fluidized bed and bubbling gas

BRIEF SUMMARY

The present disclosure describes methods and systems for separating desublimating vapors (e.g., carbon dioxide) from other gases (e.g., nitrogen) in a continuous separation process. An example of the type of gases that may be used with the disclosed methods and systems are condensable gases, such as carbon dioxide; unless specifically noted, any reference to carbon dioxide gas may also refer to any condensable gas, and where the disclosure refers to solid solid carbon dioxide that condenses from the condensable gas, then other solid forms of a condensable gas may be used in place of the solid carbon dioxide. The separation process is carried out in a fluidized or fixed bed having an out-bed heat exchanger. The fluidized bed may have seed particles, such as solid carbon dioxide, or other particles. When a gas with particles such as carbon dioxide is passed through a fluidized bed, then the carbon dioxide may be fluidized. The carbon dioxide, or other particles, and the gas may be sorted from the fluidized bed and transported to a separator, such as a cyclonic separator. The carbon dioxide, or other particles, and the gas from the fluidized bed may exit the particle bed vessel, that is the chamber holding the fluidized bed, in separate conduits or in the same conduit. The out-bed heat exchanger cools the process stream flowing from the bed, which may be a process stream flowing directly from the fluidized bed or may be a process stream flowing indirectly from a separator or multi-stage separator that receives the process stream from the fluidized bed. As the process stream is cooled in the heat exchanger, the condensable vapors condense, and may thereby form a condensed phase on the exterior heat exchanger surface, the interior heat exchanger surface, or on conduits located within the heat exchanger. The condensation of the desublimating vapors may also cause separation of the vapors from other gases in the process stream, thereby forming a separated light-gas stream.

Condensed solids such as, but not limited to, carbon dioxide, oxides of sulfur, oxides of nitrogen, and water, may be melted to form a liquid and used as products or sequestered using any suitable sequestration technique. For example, the separated carbon dioxide may be injected into an aquifer or other suitable underground reservoir.

The use of a bed of particles in the present invention may provide an abundance of surface area for vapor desublimation. The bed of particles may improve the efficiency of the system by minimizing the amount of desublimation that occurs on the heat exchanger surface as a total percentage of desublimation vapors. In one embodiment, the bed may be fluidized. In this embodiment, the fluidized particles may impinge the exterior surface of the conduit of the heat exchanger to reduce a buildup of condensed solids, thereby further improving the efficiency of the heat exchanger and may allow for continuous operation of the system.

In one embodiment, the system includes a separation vessel having a process stream inlet and a light gas outlet. The process stream inlet may be in fluid communication with a process stream that includes condensable vapors. A bed of particles is placed within the separation vessel. The bed of particles may be in fluid communication with the process stream, and the process stream may have sufficient pressure to flow through the bed of particles. In some embodiments, the system may include an out-bed heat exchanger, which may include one or more heat exchanger surfaces that may be connected to the separation vessel but may be located outside of the separation vessel. For purposes of this disclosure, an out-bed heat exchanger is located outside of the separation vessel and outside of the fluidized bed while an in-bed heat exchanger is located inside a fluidized bed. The temperature and pressure within the bed and heat exchanger may be sufficient to desublimate at least a portion of the condensable vapors from the process stream onto the bed of particles and/or onto an exterior of the conduit of the out-bed heat exchanger. The condensed vapors may form a condensed solid, which may thereby be separated from light gases in the process stream that exit the vessel as a separated light gas stream.

The bed of particles may include any type of particulate. In one embodiment, the bed of particles includes particles of the desublimated solid. For example, where carbon dioxide is to be separated from a process stream, the bed of particles may include particles of solid carbon dioxide. The particles may also include other non-condensable materials such as inorganics (silica, oxides, carbonates, etc.) to improve the uniformity of particle sizes in the bed. However, heterogeneous particles are not required to be in the bed of particles.

During desublimation, the condensation of the vapors on the particles in the bed and/or the conduit may cause a buildup of mass in the bed. Solids may be removed from the vessel to maintain a desired bed volume and/or particle size. In one embodiment, particles are removed from a bottom portion of the bed where larger particles tend to accumulate. Removing condensed solids by removing particles from the bed may be used to facilitate continuous operation of the system.

The systems and methods described herein may be carried out at any temperature and pressure suitable for desublimating condensable vapors in a process stream. In one embodiment, the pressure in the vessel may be relatively low, such as a pressure in a range from about ambient pressure to about 15 psi or ambient to about 10 psi, or ambient to about 5 psi. In an alternative embodiment, the pressure may be relatively high such as in a range from about 5 psi to about 1000 psi or greater or 20 psi to about 500 psi. Where carbon dioxide is to be desublimated, the temperature and pressure within the bed of particles, separator such as a cyclonic separator, or heat exchanger may be selected for transforming gaseous carbon dioxide directly to solid carbon dioxide. The temperatures and pressures for desublimating carbon dioxide are well-known. For example, at ambient pressure, carbon dioxide vapors desublimate at a temperature of less than about 78° C.

In one embodiment, the separation unit, or system, (i.e., separation vessel, particle bed, any separators such as a cyclonic separator, and out-bed heat exchanger) may be operated at high pressure such that the exiting light gas stream may be further cooled for use as the cooling gas in the out-bed heat exchanger. In one embodiment, a separated light gas stream having a pressure greater than about 5 psi, greater than about 20 psi, or greater than about 50 psi may be expanded to cool the separated light gas stream to a temperature that is below the temperature of the bed of particles in the separation vessel. the particles separator such as a cyclonic separator, or the particles in the one or more heat exchanger. This additional cooling of the separated light gas stream may cause desublimation of a residual portion of condensable vapors in the separated light gas stream. A solids separation apparatus may be used to remove solids that form in the expansion of the separated light gas stream. The cooled separated light gas stream may then be transferred through an interior of the conduits that traverse the bed of particles, thereby drawing heat from the bed of particles.

In an alternative embodiment, the out-bed heat exchanger may be cooled using means other than the separated light gas stream. In one embodiment, the out-bed heat exchanger may include a refrigeration unit. In this embodiment, any refrigeration system may be used that is capable of achieving the desired temperatures and heat removal rates for cooling the bed of particles.

The systems and methods described herein may also include cooling steps carried out upstream from the separation unit. Prior to introducing the process stream into the vessel, the process stream is typically cooled using one or more heat exchangers. In the initial cooling process, the process stream may be dried to remove water or other liquids. In one embodiment, the process stream may be cooled using one or more recuperative heat exchangers, which may cool the process stream using the separated light gas stream. The separated light gas stream may be used in the heat recovery exchangers directly downstream from the separation vessel, or alternatively, the separated light gas stream may be used in the recuperative heat exchangers downstream from an expansion device and the out-bed heat exchanger as described above.

In one embodiment a method for separating condensable vapors from gases to form a solid includes all or a portion of the following steps: (i) providing a process stream that includes condensable vapors; (ii) cooling the process stream using one or more up-stream heat exchangers; (iii) providing a separation unit including, a vessel having a process stream inlet and a light gas outlet; a bed of particles; and an out-bed heat exchanger having one or more conduits that are at least partially submerged in the bed of particles; (iv) introducing the process stream into the separation unit downstream from the one or more up-stream heat exchangers and causing the process stream to flow through the bed of particles; (v) cooling the bed of particles using the out-bed heat exchanger under a temperature and pressure sufficient to cause at least a portion of the condensable vapors in the process stream to desublimate from the process stream onto the bed of particles and/or onto an exterior of the conduit of the out-bed heat exchanger so as to form a condensed solid and a separated light gas stream; and (vi) removing the separated light gas stream from the vessel through the light gas outlet.

In one embodiment, the method includes using a process stream that includes carbon dioxide and operating the separation unit at a temperature and pressure suitable for desublimating carbon dioxide.

The method may also include fluidizing the bed of particles. In one embodiment, the separation unit may be operated at steady state in which a rate of buildup of condensed solid on the exterior of the conduit is about the same as a rate of removal of condensed solids therefrom and the rate of accumulation of $CO_2$ in the bed particles is about the same as the rate of removal from bed by a solids transport system such as an auger. The steady state may be provided by configuring the impingement of the particles on the conduit to remove the buildup of condensed solid on the conduit at about the same rate that the buildup occurs and/or removing solids from the bed to maintain a bed volume within a desired range.

In some embodiments, the fluid bed is a circulating fluid bed, in which particles such as carbon dioxide from a flue of gas are separated from the gas, sorted by a separator, and subcooled by a heat exchanger. Thus, the particles circulate, in that they are passed from the particle bed directly or indirectly to a heat exchanger, and then the particles are subcooled and passed back to the particle bed vessel. In some embodiments, the flue gas that enters the particle bed vessel contains light gas and also condensable vapors of carbon dioxide. In some embodiments, the particles are compressed to a density within an optimal arrange so that the solid particles do not move only with the gas as the gas moves but can be separated out from the gas. Under condensing conditions, the carbon dioxide will tend to condense like a frost on apparatus surfaces, but conditions in the particle bed vessel or the heat exchanger allow the particles to bump into each other and thereby become denser. The apparatus and methods herein may sort carbon dioxide, or other particles, when the particle differ in density. In some preferred embodiments, the shape of the particles become more spheroid, semi-spheroid, partially spheroid, round, or spherical as the particles are caused to bump into other particles or surfaces. Particles after receiving subcooled may be recirculated or reinjected into the particle bed vessel to assist in lowering the temperature of the particle bed.

These and other objects and features of disclosed embodiments will become more fully apparent from the following description and appended claims, or may be learned by the practice of disclosed embodiments as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The systems and methods disclosed herein relate to separating condensable vapors from a process stream (e.g., the flue gas from a power plant) to form a solid and a separated light gas stream. For example, in one embodiment, the methods and systems relate to condensing carbon dioxide vapors from a process stream that includes carbon dioxide and nitrogen. The systems and methods employ a particle bed cooled by an out-bed heat exchanger to desublimate the condensable vapors. The vapors are condensed on the bed particles to form a solid or adsorbed liquid while the lighter gases, which are not condensed, form a separated light-gas stream. The condensed vapors may be used in any desired way. For example, where the condensed vapors are carbon dioxide, the solid carbon dioxide may then be melted and sequestered using any suitable sequestration technique.

The systems and methods of the invention may be used to separate condensable vapors in any process stream that includes a mixture of gasses, some of which may be readily caused to change phase. The process stream is typically produced in a hydrocarbon processing plant. Examples of hydrocarbon processing plants that produce a process stream suitable for use in the present invention include, but are not limited to coal fired power plants, a natural gas fired power plants, and/or fuel oil fired power plants. While the present invention is particularly advantageous for use with process streams from power plants, the invention may also be used with other industrial process streams, such as, but not limited to process streams from petroleum refining. Any disclosure for a specific figure may be used with a different figure.

I. Systems for Condensing Vapors

Figure 1:
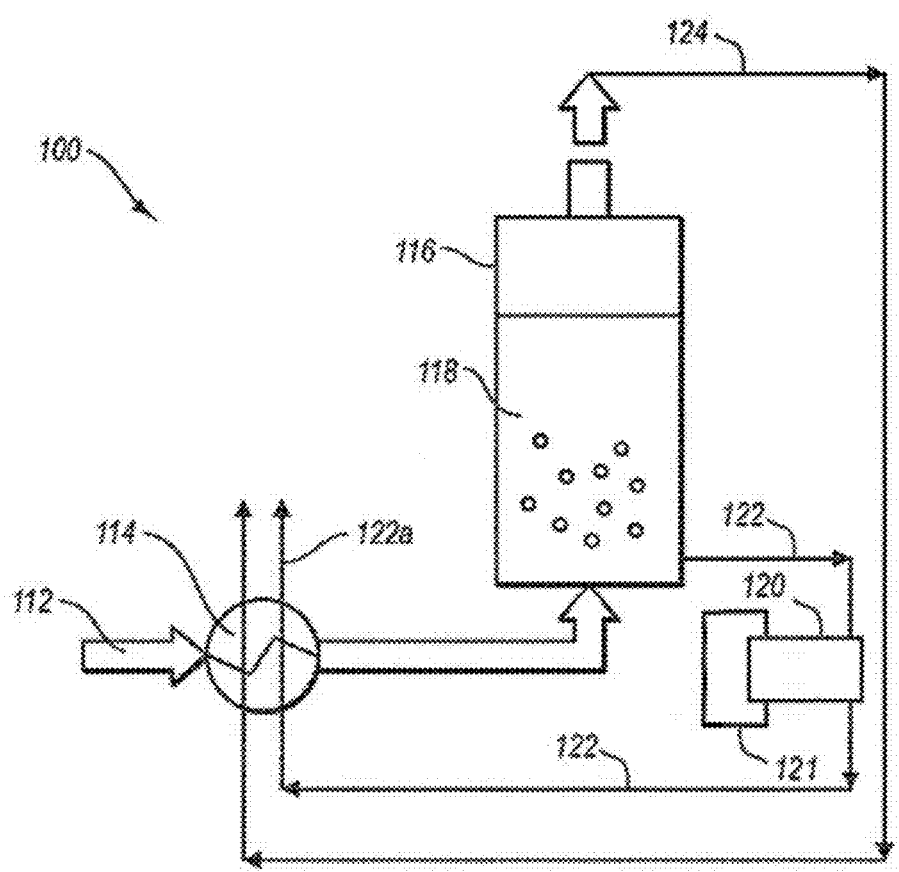
FIG. 1 is a schematic diagram of a system for separating condensable vapors from gases.

FIG. 1 is a schematic diagram of an illustrative system 100 for separating condensable vapors from gases. System 100 includes a process stream 112 in fluid communication with a recuperative heat exchanger unit 114. Recuperative heat exchanger unit 114 cools the process stream to a temperature near the condensation point of condensable vapors present in the process stream 112. The process stream 112 flows to a particle bed vessel 116 that includes a particle bed 118 and may be connected directly or indirectly to an out-bed heat exchanger 120. A coolant from external refrigeration unit 121 cools heat exchanger 120, which cools particle bed 118 to a temperature below the condensation point of the condensable vapors present in the process stream 112. As the vapors flow over the particle bed 118, the vapors condense on the particles to form a solid. During condensation, the condensable vapors separate from other gases in stream 112, thereby forming light-gas stream 124.

The condensed solids are removed from vessel 116 as solid-particle stream 122. In the preferred embodiments, solid particle stream 122 may be transported to a separator 1000 and then an out-bed heat exchanger 120 which may receive coolant from external refrigeration unit 121. Solid particle stream 122 may be optionally melted in recuperative heat exchanger unit 114 to provide cooling for process stream 112. Light-gas stream 124 may be used to cool process stream 112 in heat exchanger unit 114. Cooling process stream 112 using light-gas stream 124 and/or solid-particle stream 122 may recover a portion of the energy expended in cooling stream 112. This recuperative process may improve the efficiency of the overall separation system 100.

Figure 2:
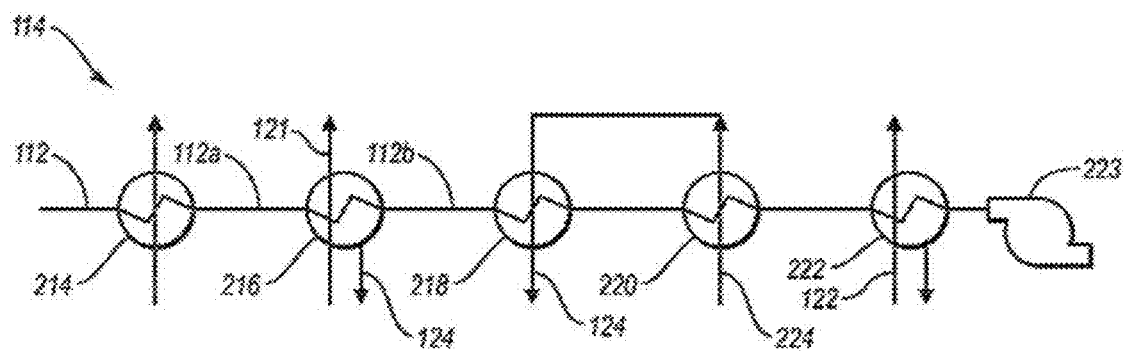
FIG. 2 is a schematic diagram of the heat exchanger for cooling a process stream upstream from a separation vessel.

Heat exchanger unit 114 may include any number of compressors, heat exchangers, fans, pumps, conduits, valves, sensors, controllers, and other components known in the art for cooling, drying, pressurizing, and/or purifying a process stream. FIG. 2 provides an illustrative example of a recuperative heat exchanger unit 114 including a plurality of heat exchangers 214, 216, 218, 220, and 222. Process stream 112 is first typically cooled to ambient temperatures using water and/or air in one or more cooling processes. For example, water 219 may be used to cool process stream 112 using techniques known in the art to produce a process stream 112a at ambient temperature. In a second heat exchanger, process stream 112a is cooled in heat exchanger 218 to condense any water vapors that may exists in process stream 112a to produce a dry process stream 112b. Process stream 112a may be cooled using any suitable coolant 121. Coolant 121 may be provided from streams 122 and/or 124 or be cooled using non-recuperative techniques known in the art, such as, but not limited to an external refrigeration unit. Second heat exchanger 216 may include a separator for removing condensed water 124.

Dry process stream 112b may be introduced into any number or any type of heat exchangers to cool the process stream to a temperature just above the condensation temperature of the condensable vapors present in the process stream (i.e., the condensable vapors to be removed through the particle bed). FIG. 2 shows the process stream 112b being introduced into a series of heat exchangers 218, 220, and 222 and then through a fan 223. Heat exchangers 218, 220, and 222 cool the process stream to a temperature just above the frost or dew point of the condensable vapors and fan 223 provides pressure for injecting the cooled process stream into separation vessel 116.

In one embodiment, cold separated light-gas stream 124 flows through heat exchangers 218 and 220 as a coolant. In heat exchangers 218 and 220, cold separated light-gas stream 224 may flow counter to the flow of the process stream 112 b such that the colder portion (i.e. upstream portions) of stream 124 are in thermal contact with the colder (i.e. downstream portions) of stream 124.

Flowing the light gas stream 124 counter to the flow of dry process stream 112 b may be done through multiple heat exchangers using any number of heat exchangers necessary to achieve a desired cooling efficiency. Alternatively, or in addition to using multiple heat exchangers, the light-gas stream 124 and the process stream 112 b may have counter flow within a single heat exchanger. For example, heat exchangers that include conduits with parallel flow for the process stream 112 b and the light-gas stream 124 may include a counter directional flow. Counter flow may be beneficial to ensure that the coldest portion of the light gas stream 124 comes into contact with the coldest dry process stream 112 b, which enables the coldest temperatures to be achieved for process stream 112 b using the light-gas stream 124 as the coolant.

Using the cold separated light-gas stream 124 as the coolant in heat exchanger unit 114 recuperates energy expended in cooling the gasses to form the light-gas stream 124. Because the laws of thermodynamics prevent any closed system from achieving 100% efficiency, additional cooling of process stream 112 is needed at some point in system 100 to achieve the desired low temperature for condensing the vapors. If needed, a portion of the external cooling may be provided prior to vessel 116 to achieve the desired temperature for process stream 112 at the input of vessel 116.

Recuperative heat exchanger unit 114 may also include one or more heat exchanger for utilizing solid-particle stream 122 to cool process stream 112. Process stream 122 may be melted and/or heated using process stream 112 to produce a melted $CO_2$ stream, which results in cooling process stream 112.

In an illustrative embodiment, heat exchanger 222 cools process stream 112 downstream from heat exchanger 220 to produce $CO_2$ stream 112a. In an alternative embodiment, particle stream 122 may be used in a heat exchanger upstream or downstream from recuperative heat exchangers using light gas stream 124 as a coolant (e.g., heat exchangers 218 and 220). Stream 122 may also be used in any number of heat exchangers to provide a desired cooling efficiency.

Recuperative heat exchanger unit 114 may also be configured to remove one or more different types of impurities prior to vessel 116. Impurities are often found in the process streams as a consequence of using natural products such as coal and petroleum to produce the process stream. In one embodiment, the process stream may include, but is not limited to, mercury, NOx, SOx, combinations of these, and any other impurities known to be present in industrial process streams.

The impurities may be removed by condensing the impurity in a heat exchanger at a desired temperature and pressure. Any number of heat exchangers and/or compressors, and/or separation devices may be used to condense the impure vapors and separate them from process stream 112 b to produce a purified dry process stream. The coolant used in the heat exchanger may be a separated light gas stream 124, a condensed $CO_2$ stream (e.g., stream 122) or a coolant from an external refrigeration unit or device of comparable functionality. The separation of the impurities is carried out by selecting a proper temperature and pressure at which the impurity will condense and the other condensable vapors (e.g., $CO_2$) do not condense. Those skilled in the art are familiar with the temperatures and pressures needed to condense impurities typically found in a process stream. These impurities include but are not limited to oxides of sulfur and nitrogen ($SO_2$, $SO_3$, NO, $NO_2$), water at sub-freezing temperatures, halogenated gases (HCl, $HgCl_x$) mercury, arsenic compounds, and other impurities common to flue gases and of operational, health, or environmental concern. Generally, these compounds desublimate when temperatures of particles or surfaces are at or below the freezing points of these compounds. Typical freezing points for compounds of relevance are provided in Table 1 below.

TABLE 1

| Compound | Freezing Point (° C.) |
| --- | --- |
| SULFUR DIOXIDE | 73.15 |
| SULFUR TRIOXIDE | 16.8 |
| CARBON DIOXIDE | 56.57 |
| WATER | 0.00 |
| NITROGEN DIOXIDE | 11.25 |
| NITRIC OXIDE | 161.0 |

Figure 6:
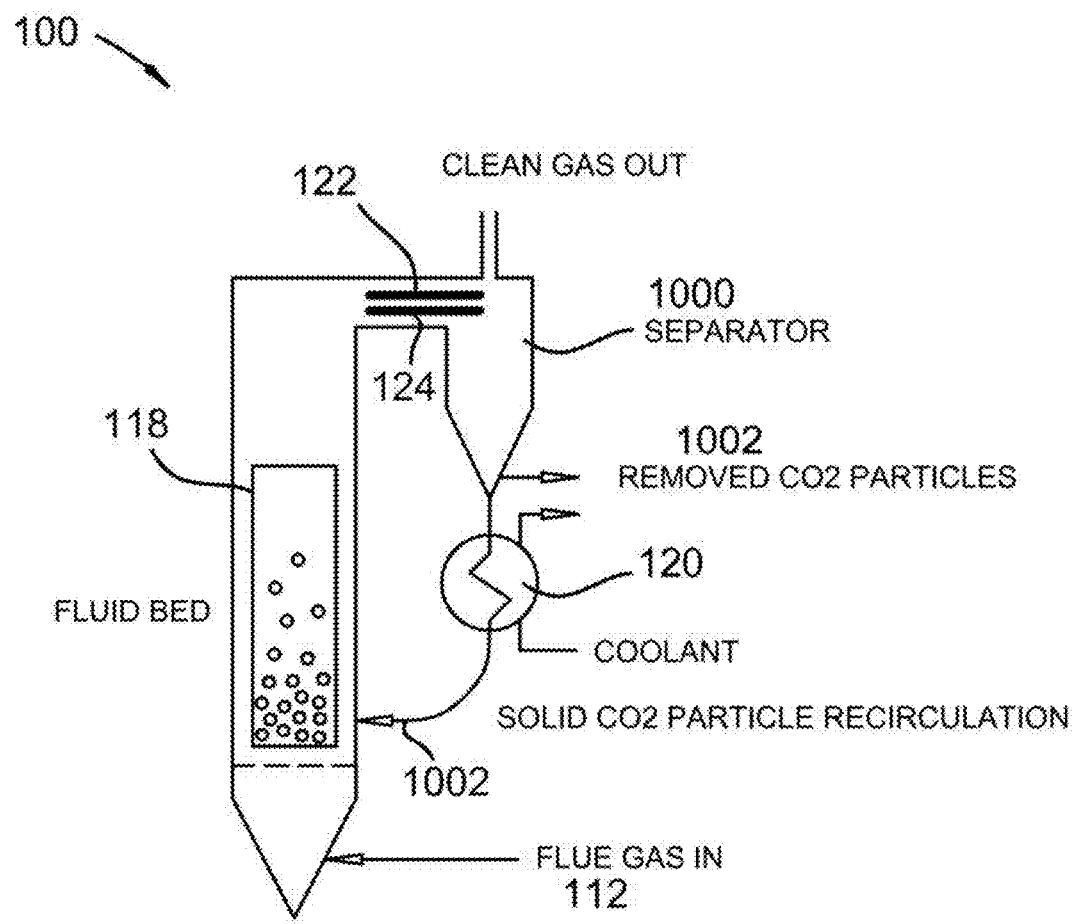
FIG. 6 is a schematic diagram of a system for separating condensable vapors.

Referring to FIG. 6, a schematic diagram of an illustrative system 100 for separating condensable vapors from gases is depicted. System 100 includes a process stream 112 in fluid communication with a vessel or chamber that houses particle bed 118 and, in the preferred embodiments, is coupled to a separator 1000, such as a cyclonic separator, which in turn may then be coupled to an out-bed heat exchanger 120. In the preferred embodiments, solid particle stream 122 may be transported to a separator 1000 and then an out-bed heat exchanger 120 which may receive coolant from external refrigeration unit 121. Solid particle stream 122 may be optionally melted in recuperative heat exchanger unit (not shown in this figure) to provide cooling for process stream 112. Light-gas stream 124 may be used to cool process stream 112 in heat exchanger unit 114. Cooling process stream 112 using light-gas stream 124 and/or solid-particle stream 122 may recover a portion of the energy expended in cooling stream 112. This recuperative process may improve the efficiency of the overall separation system 100. Coolant may be added to out-bed heat exchanger 120.

Separator may be a cyclonic separator 1000. The separator, such as the cyclonic separator A cyclonic separator is a device which removes particles from a stream of air, liquid by vortex separation, which may include the use of rotational effects and gravity. In the fluidized bed, particles may be fluidized. The fluidized particles may rise to above the center of gravity of the bed and may then be transported out of a top port or a side port. In some embodiments, the fluidized particles overflow the top of the vessel housing the fluidized bed. In other embodiments, fluidized particles may have a different speed or density than other particles in the fluidized bed, and the fluidized particles may then move as a group to an exit port, and thus be separated from the body of the fluidized bed. For example, fluidized carbon dioxide from a flue gas stream may behave differently than the other particles of the fluidized bed which may allow for separation of the carbon dioxide from the flue gas stream.

Carbon dioxide particles, which may be solid, may be removed from the separator, such as the cyclonic separator by methods known in the art including the structures and methods described herein for effecting the movement of carbon dioxide or other particles through a conduit, aperture, or other structure. Swinging gate may be used, as well as sensors that determine the presence of certain types of particles, such as certain carbon dioxide particles or carbon dioxide particles of a certain size, and then the detection of a certain level or type of carbon dioxides by the system actuates the opening, and then the closing, of a gate to an exit conduit. Removed carbon dioxide particles 1002 of FIG. 6 are shown being removed; the location of the removal of the carbon dioxide with respect to the separator is not limited to the position depicted in the figure.

In the heat exchanger that may be connected to the separator, the particles may be cooled to a temperature that is lower than the necessary temperature for them to be solid. For example, $CO_2$ has a freezing point of −78.5 deg C. so when it is cooled to −120.5 deg C. it has 42 deg C. of subcooling. In this situation, the particles may then be warmed approximately 42 degrees C. without becoming a gas. In the fluidized bed, which may be circulating and desublimating, the $CO_2$ may be subcooled in a heat exchanger 120 outside the fluid bed so the heat exchanger that cools the particles is providing sensible cooling to already solid $CO_2$. Subcooled $CO_2$ may then be injected back into the fluid bed where it warms as it cools the gas and desublimates more $CO_2$. The particles, in some embodiments, not be warmed enough to change phases back to a gas (i.e. the temperature of the $CO_2$ after it warms is no greater than −78.5 deg C.).

Figure 3:
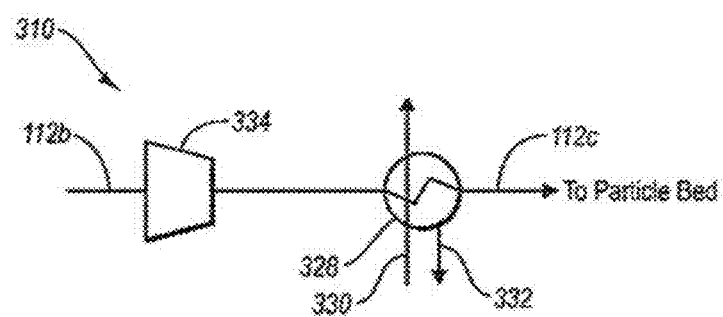
FIG. 3 is a schematic diagram of a heat exchanger for removing impurities from a process stream upstream from a separation vessel.

FIG. 3 illustrates a subsystem 210 of system 100 that may be used to remove impurities. Subsystem 310 includes conduit for carrying process stream 112 b, which may be coupled to an optional compressor 334 and a heat exchanger/separator 328. Compressor 334 optionally compresses dry process stream 112 b to a desired pressure for condensing the impurities in stream 112 b. A coolant 330 is used in heat exchanger 328 to cool dry process stream 112 b to a temperature suitable for condensing one or more impurities to form a liquid impurities stream 332. The liquid impurities stream is withdrawn from heat exchanger/separator 328 to produce a purified process stream 112 c. Purified process stream 112 c may then be further processed to remove additional impurities, cooled to a colder temperature, and/or introduced into vessel 116. Liquid impurities stream 332 may be further processed into desirable products and/or disposed of and/or used to cool process stream 112 upstream from being separated (i.e., in a recuperative heat exchanger process).

The impurities may be condensed and removed from process stream 112 b prior to vessel 116 to minimize the concentration of impurities in the solid-particle stream 122, which will typically be sequestered, and minimize the concentration of impurities in separated light gas stream 124, which will typically be vented to the atmosphere.

In one embodiment, system 100 may include one or more compressors upstream from vessel 116. The use of compressors may reduce the volume of the process stream, thereby making it easier to handle large flows. The number of compressors and heat exchangers may depend in part on the desired operating pressure of the separation system 100. Where ambient pressure or relatively low pressure (e.g., ambient to 10 psi) is desired, one compressor or even just a fan pump may be sufficient for maintaining pressure. Where high pressure (e.g., tens of psi to hundreds of psi) is desired, up to hundreds of compressors and heat exchangers may be used in recuperative heat exchanger unit 114. A staged compressor/heat exchanger system for high pressure improves the efficiency of cooling and compressing the process stream.

In one embodiment, the pressure in the vessel may be relatively low, such as a pressure in a range from about ambient pressure to about 15 psi or ambient to about 10 psi, or ambient to about 5 psi. In an alternative embodiment, the pressure may be relatively high such as in a range from about 5 psi to about 1000 psi or greater or 20 psi to about 500 psi.

FIGS. 2 and 3 illustrate examples of embodiments where process stream 112 is purified, cooled, and pressured for introduction into particle bed vessel 116. Those skilled in the art will recognize that the particular equipment and order within the process stream may vary from that described in FIGS. 2 and 3 while still performing perform the functions useful for the systems of the invention.

Figure 4A:
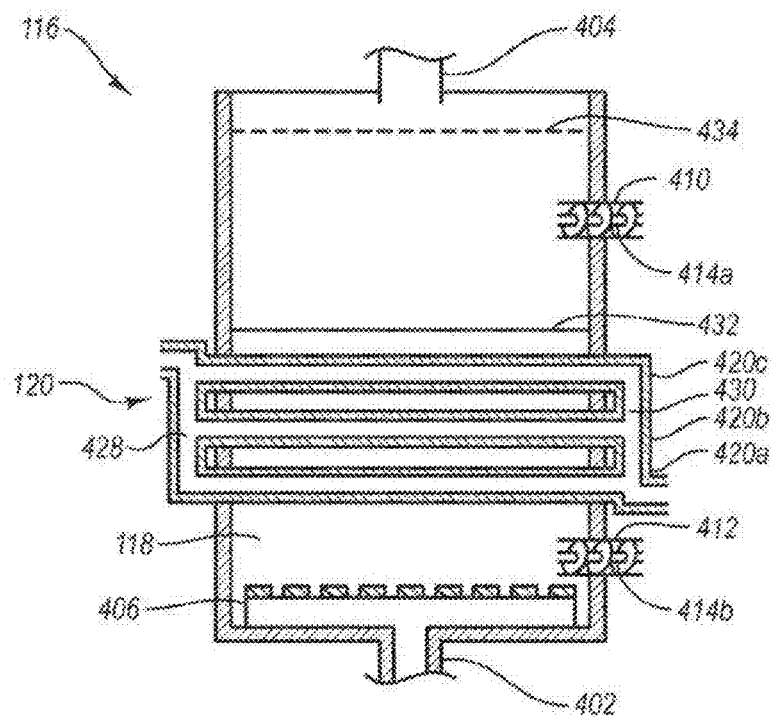
FIG. 4A illustrates a separation vessel of the system of FIG. 1.

FIG. 4A illustrates one embodiment of a particle-bed vessel 116 in additional detail. Vessel 116 includes a particle bed 118 and an in bed heat exchanger 120. Vessel 116 is sized and configured to hold a bed of particles having a suitable volume for handling the volume of process stream to be treated. Typically vessel 16 size varies in proportion to the volumetric flow rates of the gas stream, which vary widely from one application to another. Sizes of relevance to this technology range from 1 cm to many meters or tens of meters. However, the diameter may vary depending on the number of vessels and the volume of process stream being treated. In one embodiment, the diameter of the vessel may be in a range from about 1 m to about 50 m or about 3 m to about 20 m.

Vessel 116 may have any shape suitable for accommodating a particle bed and an out-bed heat exchanger. Typical shapes include columnar vessels having a rectangular or circular cross section. Vessels with a circular cross section may be advantageous where high pressure is desired.

Vessel 116 includes openings for introducing and removing gaseous components and solid components from the vessel. Vessel 16, shown in FIG. 4A, has a gaseous inlet 402 and a gaseous outlet 404. The gaseous inlet is coupled to a distribution apparatus 406. Gas introduced into gas inlet 402 is distributed through distribution apparatus 406, which serves as a manifold for delivering the volume of gas into particle bed 118.

Figure 4B:
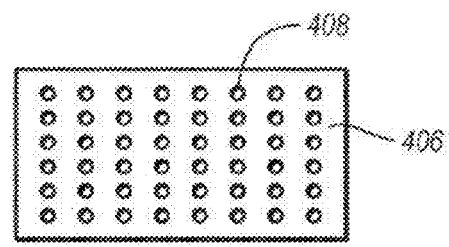
FIG. 4B illustrates a top view of a distribution plate of the separation vessel of FIG. 4A.

As shown in FIG. 4B, distribution apparatus 406 includes a plurality of nozzles 408 that provide a desired pattern and pressure for injecting the process stream into the bed 18. Any distribution apparatus with a plurality of nozzles may be used so long as the size, configuration, and spacing of the nozzles is appropriate for obtaining the distribution and pressure of process stream needed to cause the desired flow through bed 118. For example, distribution apparatus 406 may have nozzles with a diameter in a range from about 2 mm to about 5 cm with various specific designs, including sieves, bubble caps, and related designs, and included a density of nozzles in a range from about 10% coverage to about 67% coverage.

Typically the distribution apparatus 406 is positioned near the bottom of vessel 16. The gas outlet 404 is typically near the top of vessel 16 (i.e., above bed 18 during operation) such that flow of the process stream extends through bed 16.

As mentioned, vessel 16 includes a particle bed 118 onto which condensable vapors are condensed during use. Particle bed 118 is positioned within vessel 116 between gas inlet 402 and gas outlet 404 such that gas flow occurs through particle bed 118. The bed of particles may include any type of particulate. In one embodiment, the bed of particles includes particles of condensed solid. For example, where carbon dioxide is to be separated from the process stream, the bed of particles may include particles of solid carbon dioxide. The particles may also include other non-condensable materials (e.g., sand) in order to improve the uniformity of particle sizes in the bed. However, heterogeneous particles are not required.

The size of the particles in the bed are typically selected to provide a desired surface area and particle packing to achieve a desired flow of process stream through the bed and/or a desired amount of lifting of the bed by the flow of process stream (i.e., desired amount of fluidization). In one embodiment, the particle size of the bed is in a range from about 0.05 mm to about 20 mm or in a range from about 0.1 mm to about 10 mm, or about 0.2 mm to about 1 mm. Bed particle size and size distribution depends in part on the fluidization regime, gas density and velocity, and particle density.

The height of the bed 118 in vessel 116 may depend on the type of bed being used and the operating conditions of the vessel. In one embodiment, the particle bed is a fluidized bed. As explained in more detail below, the fluidized bed is made fluid by selecting a process stream flow rate and particle size to cause the particle bed to be fluidized by the flow. In this case, the bed will expand during use and a proper amount of space in vessel 116 is provided to allow the bed to expand a desired distance. FIG. 4A shows bed 118 filled to non-fluidized level 432, which is above out-bed heat exchanger 120. Level 434 shows the level that the bed reaches when the process stream gas is injected and the particles are fluidized. While FIG. 4A shows a fluidized bed, those skilled in the art will recognize that the invention may also be carried out using a fixed bed, in which case the excess volume (i.e., the volume between levels 432 and 434) are not necessary.

Vessel 16 includes a solids inlet 410 and a solids outlet 412 for adding and removing solids to and from bed 118. Typically, the solids outlet is near the bottom of the bed and the solids inlet is near the top of the vessel and/or the top of the bed 118 during use. Solid inlet 412 and/or solids outlet 414 may include augers 414 $a$ and 414 $b$, respectively to move solids into and out of vessel 116. However, other known mechanisms for introducing and removing solids from a vessel may be used.

Figure 4C:
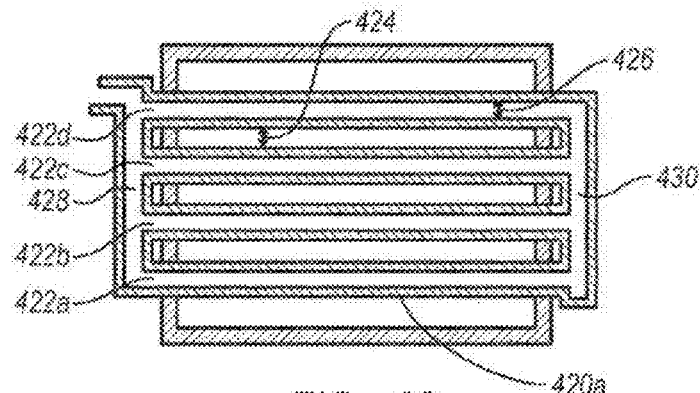
FIG. 4C is a top cross sectional view of the out-bed heat exchanger of FIG. 4A.

As mentioned above, a heat exchanger 120 is positioned within bed 118 in vessel 116. Heat exchanger 120 includes a plurality of conduits 420. The plurality of conduits 420 may be placed horizontally and vertically relative to one another. FIG. 4A shows three layers of conduits 420 $a$, 420 $b$, and 420 $c$, spaced vertically. FIG. 4C is a cross section of FIG. 4A showing a horizontal placement of conduits in layer 420 $a$. Layer 420 $a$ includes four horizontally positioned individual conduits 422 $a$, 422 $b$, 422$c$, and 422 $d$ (collectively referred to as individual conduits 422).

Individual conduits 422 and the individual conduits of layers 420 $b$ and 420 $c$ are spaced apart to provide space that allows the bed of particles 118 to fill in and contact the exterior surface of the conduits and transfer heat. The gap between individual conduits and between layers of the out-bed heat exchanger may be selected to ensure proper volume for the bed 18 and ensure proper heat transfer to the bed. In one embodiment, gap distance 424 is in a range from about 0.75 to about many heat exchanger tube diameters, although other distances may be used if desired. Examples of suitable gap distances between layers of the heat exchanger may also be in a range from about 0.75 to many heat exchanger tube diameters.

The conduit diameter 426 is typically selected in combination with the number of conduits, volume of process stream flow, particle bed size and coolant temperature to ensure adequate heat transfer for cooling the particle bed. Examples of suitable sizes include, but are not limited to, 1 cm to about 20 cm.

The shape of the plurality of conduits may be any shape that provides the desired surface area and contact for cooling the bed 118. To facilitate installation, cleaning and repair, straight tubing may be advantageous, although other designs may be used.

In one embodiment layers 420 $a$, 420 $b$, and 420 $c$ may be horizontally offset such that the gaps between individual conduits 422 are not aligned vertically with the gaps of one or more layers positioned above layer 420 $a$. Heat exchanger 120 may include more or fewer layers of conduits and/or more or fewer conduits in any number of conduits so long as the desired surface area and spacing may be achieved.

The plurality of conduits of heat exchanger 120 may be supplied a coolant through inlet and outlet manifolds that distribute the coolant throughout the plurality of conduits. FIGS. 4A and 4C illustrate one configuration of an inlet manifold 428 and an outlet manifold 430. Those skilled in the art are familiar with manifolds for efficiently distributing a coolant through a plurality of conduits in a heat exchanger.

A coolant is delivered through the interior of the conduits 422 of heat exchanger 120 to cool bed 118. The coolant is selected to provide efficient cooling. The type of coolant used typically depends on the particular method for cooling the coolant. In the embodiment shown in FIG. 1, the coolant is cooled using an external refrigeration unit 121. Examples of suitable coolants for use with external refrigeration units include but are not limited to argon, nitrogen, tetrafluromethane, ethane, carbon dioxide, 1,1-difluroethane, 1,2-difluoethane, propane, fluorinated propanes, n-butane, and iso-butane. In addition, there are many traditional refrigerants of interest that fall generally into the classification of chlorofluorocarbons. Chlorofluorocarbon refrigerants pose both global warming and ozone threats and may be restricted to applications in which the risk of their release to the environment is minimal. Those skilled in the art are familiar with refrigeration units that may be used to cool an out-bed heat exchanger. The heat exchanger may also be cooled using the separated light gas stream from vessel 116 (e.g., the cold nitrogen stream separated from a cold light gas stream). Examples of systems using the cold, separated light gas stream are described below with respect to FIG. 5.

Figure 5:
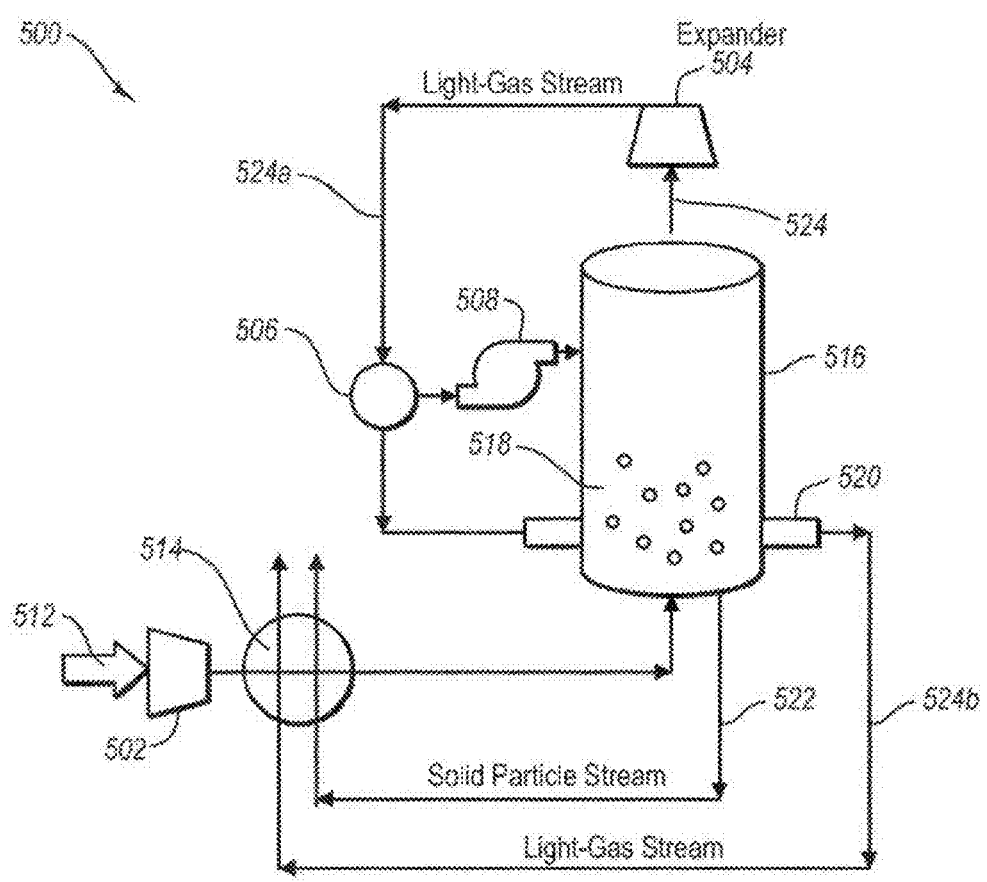
FIG. 5 is a schematic diagram of a system for separating condensable vapors from gases using elevated pressures.

FIG. 5 describes an alternative system 500 in which a separated light gas stream 524 is used as the coolant in an out-bed heat exchanger. System 500 includes a compressor 502 that pressurizes process stream 512. The pressure in process stream 512 is utilized downstream from the particle bed vessel 516 in an expansion process that cools light gas stream 524 to a temperature suitable for use in the out-bed heat exchanger 520. In one embodiment, system 500 configured to operate at a pressure substantially above ambient pressure. For example, system 500 may be operated at a pressure in a range from about 0.5 atm to about 20 atm more preferably about 1 atm to about 10 atm or about 1 atm to about 7 atm.

The expansion process utilizes an expander 504 downstream from the vessel 516. The cold separated light gas stream 524 is expanded to lower the temperature below the temperature in the bed 518. The lower temperature of expanded light gas stream 524 a allows stream 524 a to be used as the coolant in the out-bed heat exchanger 520, which is submersed in particle bed 518. The expansion process may be used to avoid the need to use an external refrigeration unit.

In one embodiment, a solids separator 506 may be used to remove solids that may form during the expansion of light gas stream 524 in expander 504. In some cases, light gas stream 524 may have some condensable vapors that were not separated out in vessel 516. Expanding the light gas stream 524 may cause an additional portion of the condensable vapors to form a solid. This additional condensation may remove additional amounts of $CO_2$ from system 500. The amount of solids generated from expansion of light gas stream 524 is typically small compared to the mass of solids removed in particle bed 518. The solids produced from expansion and separated using 506 may be introduced into vessel 518. To maintain pressure in vessel 508, separated solids may be pressurized using pressurizer 508 upon injection into vessel 516. In an alternative embodiment, the separated solids may be melted and used in recuperative heat exchanger unit 514 and/or mixed with solid particle stream 522.

The process stream 512 is typically pressurized upstream from vessel 516. Process stream 512 may be pressurized using any number of compressors and heat exchangers. In one embodiment, a plurality of compressors and heat exchangers alternating in series are used to compress and cool process stream 512. Using alternating compressors and heat exchangers in series may improve the efficiency of reducing the temperature and increasing the pressure. System 500 may have a vessel 516 that is similar to vessel 116 described with respect to FIGS. 4A-4C so long as vessel 516 is configured to withstand the operating pressure.

In one embodiment, the pressure within vessel 516 is at least about 5 psi, more preferably at least about 20 psi, and most preferably at least about 50 psi or even several hundred psi. Higher pressure allows for greater expansion and reduction in temperature for cooling the separated light gas stream for use as the coolant in the out-bed heat exchanger.

Operating at pressures above ambient pressure may also be advantageous for removing impurities from process stream 512 (e.g., using the structure described in the figures depicting an apparatus or a series of such equipment).

II. Methods for Condensing Vapors

The present invention includes methods for condensing vapors from a process stream using a particle bed vessel and out-bed heat exchanger. In one embodiment, the method includes (I) providing a process stream that includes condensable vapors; (ii) cooling the process stream using one or more up-stream heat exchangers; (iii) providing a separation unit including, a vessel having a process stream inlet and a light gas outlet; a bed of particles; and an out-bed heat exchanger comprising one or more conduits at least partially submerged in the bed of particles; (iv) introducing the process stream into the separation unit downstream from the one or more up-stream heat exchangers and causing the process stream to flow through the bed of particles; (v) cooling the bed of particles using the out-bed heat exchanger under a temperature and pressure sufficient to cause at least a portion of the condensable vapors in the process stream to desublimate from the process stream onto the bed of particles and/or onto an exterior of the conduit of the out-bed heat exchanger so as to form a condensed solid and a separated light gas stream; and (v) removing the separated light gas stream from the vessel through the light gas outlet.

The step of providing the process stream may include providing conduits, pumps, valves, and/or other hardware suitable for delivering a gas from a process plant to a separation unit such as system 10 or system 500 described above. The processing plant may be a hydrocarbon plant such as a coal fired, liquid fuel fired, or gas-fired power plant. Alternatively, the process stream may be a flue gas from a chemical processing plant such as a refinery. The process stream includes at least one condensable vapor. In a preferred embodiment, the condensable vapor is carbon dioxide.

The process stream is cooled to a temperature just above the dew point or frost point of the condensable vapor. The dew point or frost point of the condensable vapor depends on the particular condensable vapor and the pressure of the system. For example, the frost point of carbon dioxide at near ambient pressures is about 78° C. Those skilled in the art are familiar with calculating the frost or due point of various condensable vapors in the process stream. The process stream may be cooled to within about 10 degrees Celsius of the dew point or frost point of the condensable vapor, more preferably about 5, and most preferably within about 2. Cooling the process stream may be carried out using any technique, including those described above with regard to system 10 or system 500. For example, the methods may include drying the process stream by removing water and/or removing impurities from the process stream.

In one embodiment, process stream 512 is purified prior to being introduced into vessel by condensation in one or more heat exchangers. Impurities that may be removed by condensation include, but are not limited mercury, $NO_x$, and/or $SO_x$. In one embodiment, the purified process stream may have less than about 1 ppm mercury, less than about 1 ppm sulfur, and less than about 1 ppm oxides of nitrogen except NO, which may exist at much higher concentrations because of its high volatility even at low temperatures. In embodiment, the total trace pollutants is less than about 1 ppm.

Additional details regarding systems and methods for cooling and/or purifying a process stream may be found in Applicants co-pending PCT application serial number PCT US2008/085075, which is hereby incorporated by reference.

The method includes the step of introducing the cooled process stream into a particle bed under conditions suitable for condensing the condensable vapors onto a solid surface. The separation unit may include a particle bed disposed in a vessel such as vessel 116 or vessel 516, described above with respect to FIGS. 1-5.

In one embodiment, the pressure in the vessel may be relatively low, such as a pressure in a range from about ambient pressure to about 15 psi or ambient to about 10 psi, or ambient to about 5 psi. In an alternative embodiment, the pressure may be relatively high such as in a range from about 5 psi to about 1000 psi or greater or 20 psi to about 500 psi. The desired pressure within the vessel may be provided using one or more compressors and/or fans upstream from the vessel.

The temperature within the particle bed may be in a range from about 80° C. to about 120° C., or about 100° C. to about 135° C., or about 100° C. to about 145° C. In preferred embodiments, the temperature within the particle bed may be below the dew point or frost point of the gas from which the condensable vapor will be recovered. The temperature of the particle bed is provided by the out-bed heat exchanger within the vessel. In a preferred embodiment, the particle bed has a temperature below the frost point or dew point of the condensable vapor within the process stream. In one embodiment, the temperature of the particle bed is 30° C. to 40° C. degrees below the dew point or frost point, or 40° C. to 55° C. degrees below the frost point or dew point or 40° C. to 65° C. degrees below the frost point or dew point The process stream is injected into the vessel through a distribution apparatus and caused to flow through the particle bed under conditions that cause condensation of the condensable vapors. As the process stream flows through the particle bed, the temperature of the process stream drops below the dew point or frost point and the condensable vapors condense on the solid particles of the bed. The condensed vapors are separated from gases in the process stream that have a condensation point below that of the condensable vapors. As the condensable vapors condense on the particles of the bed, the condensable vapors are separated from the remaining gases in the process stream (e.g., nitrogen), thereby forming a light gas stream that exits the vessel through the light gas stream outlet.

This separation technique may advantageously be carried out in a continuous or semi-continuous process in which the condensable vapors are condensed on the particles of the bed. The condensed vapors add to the mass of the particles and therefore increase the volume of the bed. The volume of the particle bed in the operating state may be maintained within desired parameters by removing a portion of the particles through a solids outlet in the vessel. The solids may be removed using any technique such as a valve and/or an auger. In one embodiment, the amount of solids removed during operation is less than about 15%, more specifically less than 6% of the gas mass flow rate. In any case, the solids removal should equal the amount of material condensing from the gas phase.

Solids may be removed from the vessel to maintain a desired particle size in the bed. In one embodiment, particles are removed from a bottom portion of the bed where larger particles tend to accumulate. Particles may be removed or introduced into the bed through a solids inlet and/or outlets in the vessel. In some embodiments, the addition of solids may be advantageous in order to add smaller particles to maintain a desired particle size distribution with the bed. In one embodiment, the median particle size may be maintained with a range from about 0.05 mm and about 20 mm, more specifically about 0.1 mm and about 10 mm, and even more specifically about 0.2 mm to about 1 mm.

In one embodiment, the bed is operated as a fluidized bed. A fluidized bed may be provided by selecting the particle size of the bed particles and the mass flow of the process stream being injected into the vessel. At sufficiently high mass flow, the bed is fluidized. Fluidization of the bed causes expansion of the bed during use. The greater the fluidization, the greater the volume occupied by the bed during use. In one embodiment, the increased bed volume for a fluidized bed may be greater than 20%, more specifically greater than about 30%.

In one embodiment, the bed of particles is fluidized. The fluidized particles may impinge the exterior surface of the conduit of the heat exchanger and remove buildup of condensed solids from the exterior of the conduit. Removing the buildup of condensed solids from the conduit may cause the formation of new smaller particles and/or increase the size of particles within the bed. The impingement of the particles may be selected to minimize wear on the conduit while removing sufficient condensed solids to maximize heat transfer through the wall of the conduit.

The force of the impingement in a fluidized bed may depend on the mass flow rate of the fluidizing gasses, but may also depend on the size of the particles in the bed and/or the height at which the conduit traverses the bed. In one embodiment, fluidization may be achieved by using a bed with particle sizes in a range from about 0.05 mm to about 20 mm or in a range from about 0.1 mm to about 10 mm, or about 0.2 mm to about 1 mm. In one embodiment, the conduit may be placed in the bottom half of the bed of particles or in the bottom third of the bed so as to provide contact with larger particles. Placing the conduit of the heat exchanger in the proximity of larger particles tends to increase the force of impingement of the particles for a given flow rate of fluidizing gas.

In one embodiment, the method includes operating the separation unit in a steady state in which a rate of buildup of condensed solid on the exterior of the conduit of the out-bed heat exchanger is about the same as a rate of removal of condensed solids therefrom as a result of the impingement of the particles of the fluidized bed. In one embodiment, the removal of condensed vapors from the conduit is sufficient to allow continuous operation of the vessel for at least days, weeks, or even months without melting condensed solids on the exterior of the conduits.

In a preferred embodiment, the separation unit is operated economically by recovering a portion of the energy used to cool the process stream upstream from the vessel. In this embodiment, the process stream upstream from the vessel is cooled using a recuperative heat exchanger that is cooled using the separated light gas stream as the coolant.

Various types of heat exchangers may be used to subcool particles outside of the fluidized bed. Heat exchangers that subcool carbon dioxide particles, or other particles, may provide additional functions such as providing uniform particle size or packing/compressing the particles so they have an optimal density, such as a density between 0.5 and 1.5 specific gravity. In some embodiments, a density with a specific gravity of 1.1 to 1.5 is desired; in other embodiments, a density with a specific gravity of 0.5 to 0.7 is desired; in other embodiments a density with a specific gravity of 0.7 to 1.1 is desired. Sorters may be included inside of the heat exchanges or coupled to the heat exchangers, and the sorters may be cyclonic separators or other types of sorters that may be used to separate particles into groups based on their size. The fluidized bed may or may not use cyclonic separators for separating particles by size.

Figure 7A:
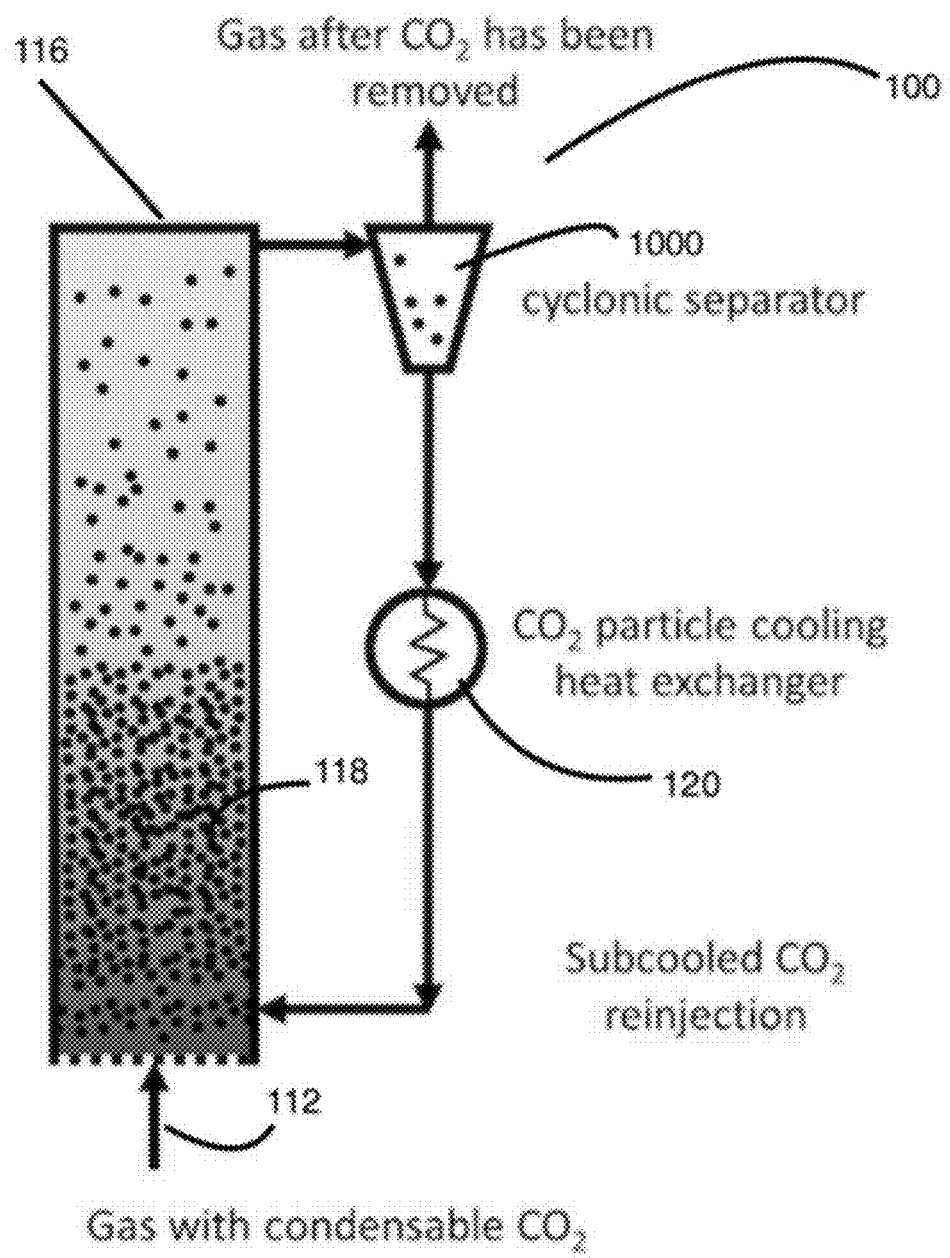
FIG. 7A-C are schematic diagrams of the system as used in a method for separating condensable vapors.

Referring to FIG. 6 and FIG. 7A, a system 100 is depicted. Flue gas, or other gas with condensable substances such as carbon dioxide, may be referred to as a process stream 112, which enters particle bed vessel 116 that includes a particle bed 118. The particle bed may be a fluidized particle bed as described earlier. Carbon dioxide, or other particles, in the flue gas may be fluidized or may condense into a solid. The condensed solids are removed from vessel 116 as solid-particle stream 122. In the preferred embodiments, solid particle stream 122 may be transported to a separator 1000 and then an out-bed heat exchanger 120 which may receive coolant from external refrigeration unit 121. Solid particle stream 122 may be optionally melted in recuperative heat exchanger (not shown in this figure) to provide cooling for process stream 112. Light-gas stream 124 may be used to cool process stream 112 in heat exchanger unit 114, and the light-gas stream may be transported to separator 1000. Separator 1000, which may be a cyclonic separator, may then sort the gas from the solids, such as nitrogen gas from solid carbon dioxide, and send the light-gas of the light gas stream to a different location for processing or even directly into the atmosphere. Cooling process stream 112 using light-gas stream 124 and/or solid-particle stream 122 may recover a portion of the energy expended in cooling stream 112. This recuperative process may improve the efficiency of the overall separation system 100. the carbon dioxide may then be sent to a cyclonic separator, or other separator 1000, or in embodiments the carbon dioxide may be directly sent to one or more heat exchanger. A light gas stream may be caused to exit the separator, as depicted by the arrow pointing upwards. Particles in the separator, such as solid carbon dioxide, may then be transferred by size, charge, or other physical characteristic. In some embodiments, no separation of the particles occurs except that the particles are separated from gases and the particles are then transported to a heat exchange 120. The particles may then be subcooled as discussed in this disclosure, and the subcooled particles may then be transported to a vessel, such as the original vessel housing the fluidized bed. The subcooled particles may be used to cool the fluidized bed.

Figure 7B:
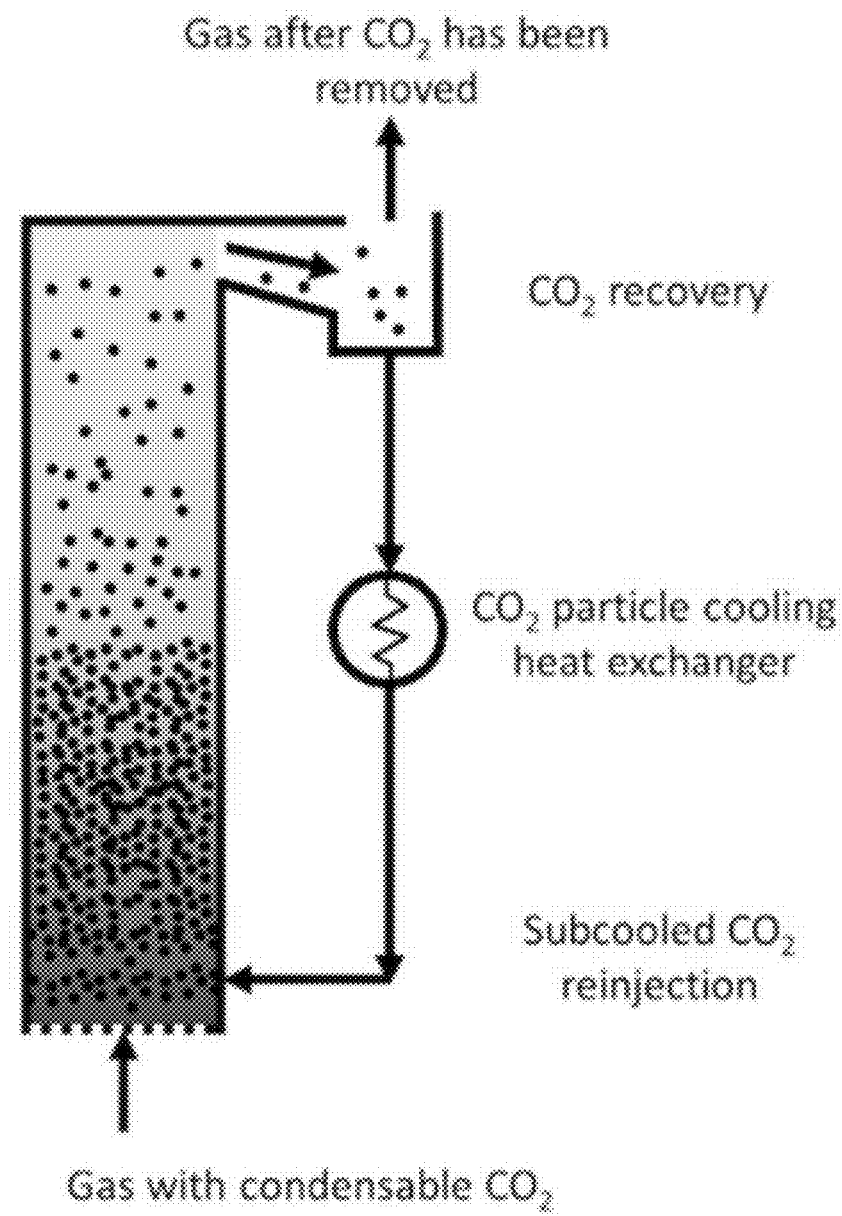

FIG. 7B depicts the system 100. At the top of the vessel with the fluidized bed is depicted a conduit between the particle bed vessel. The conduit may be opened and also may be closed. Opening of the conduit allows for particles to be transported into a separator such as a cyclonic separator. Note that any reference to carbon dioxide on the figures could be substituted with a different particle; the embodiments of the invention are not limited only to carbon dioxide.

Figure 7C:
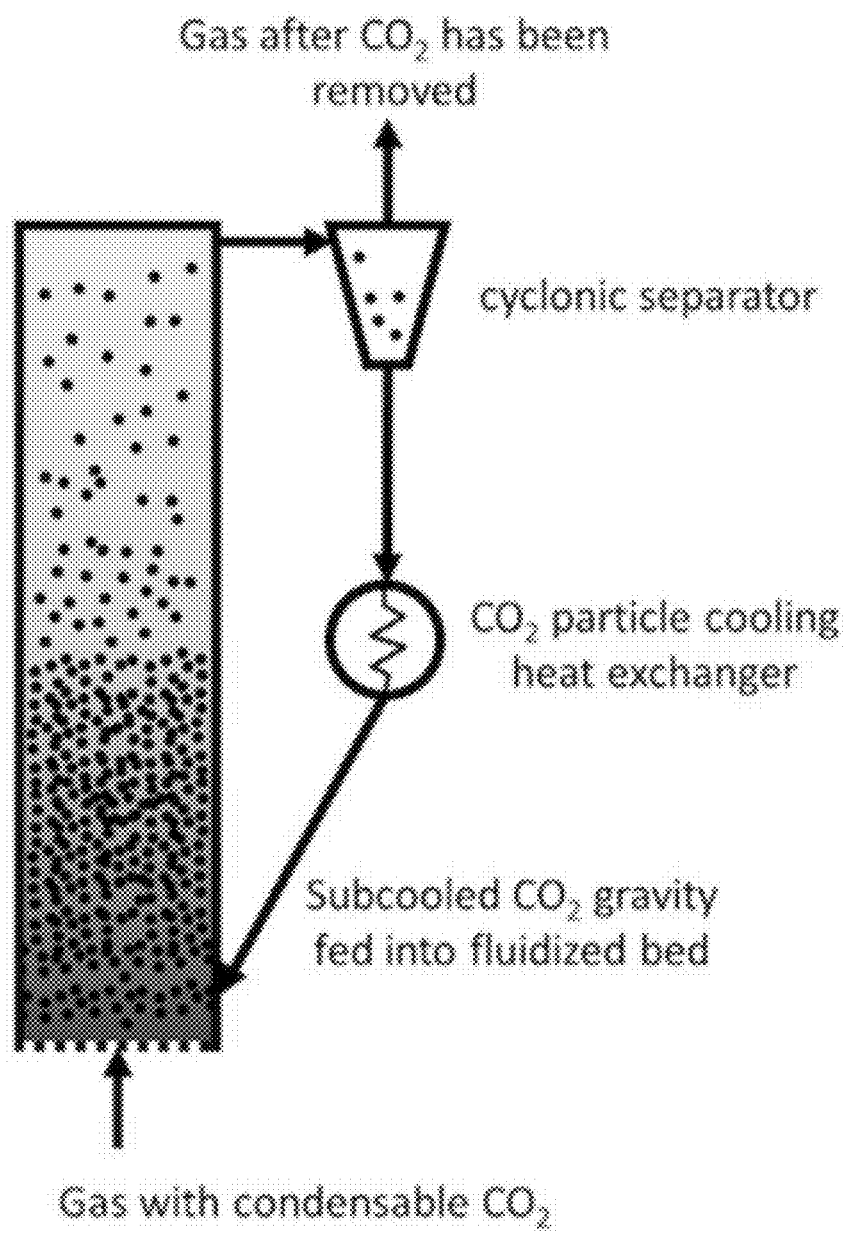

FIG. 7C depicts the system 100 showing subcooled carbon dioxide being gravity fed into the particle bed vessel. Other methods may be used to transport the carbon dioxide other than the gravity, including conveyor belts.

Figure 8A:
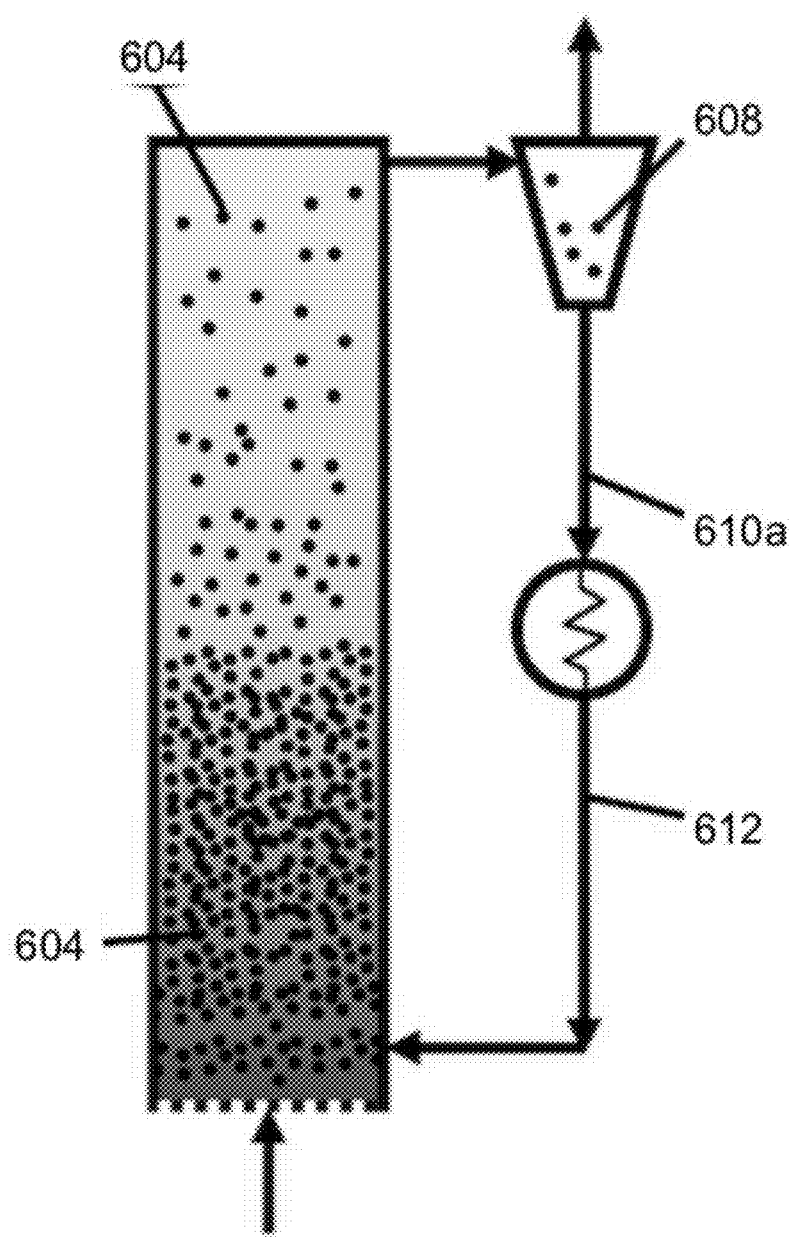
FIG. 8A is a diagram showing steps of a method for separating condensable vapors.
Figure 8B:
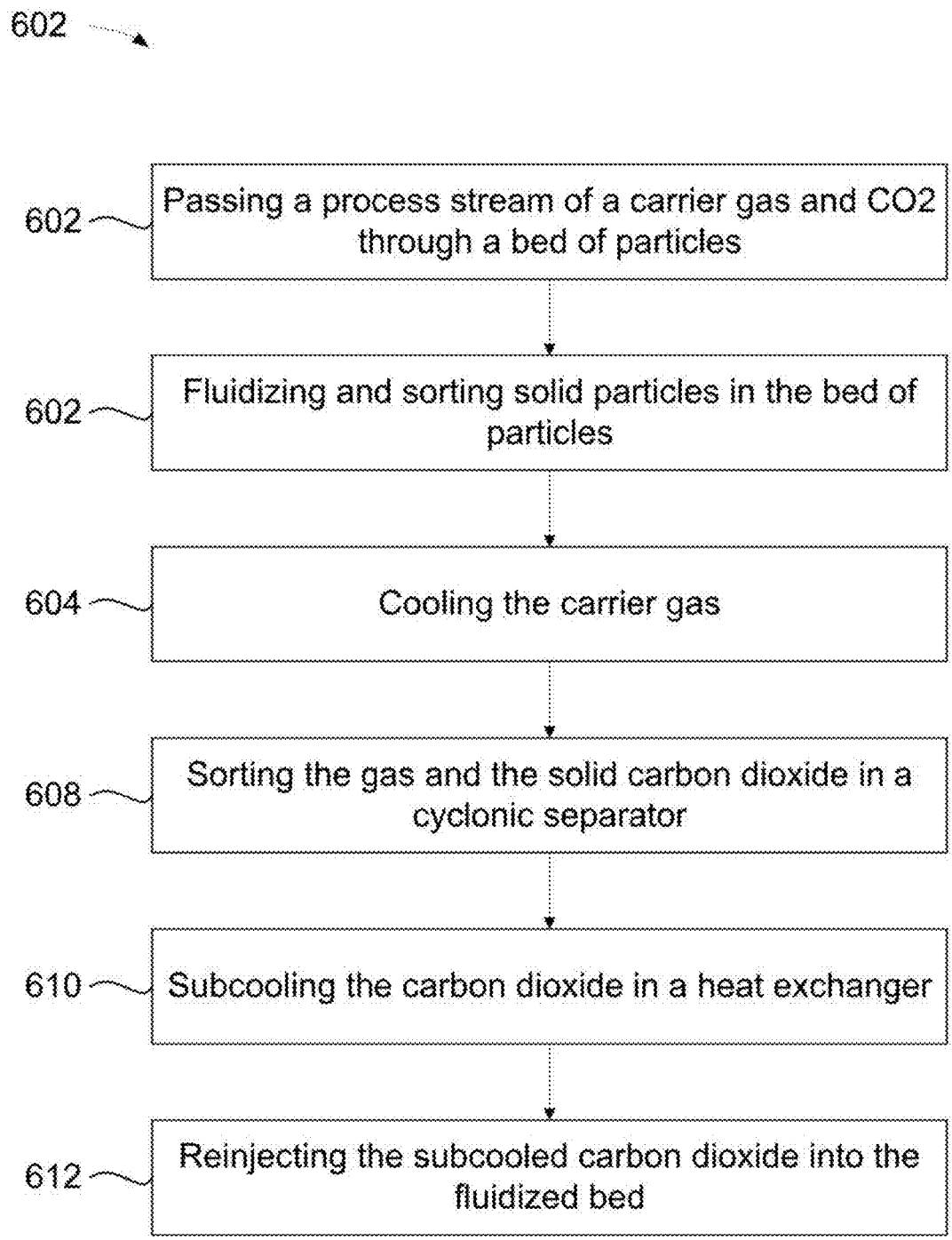
FIG. 8B is a schematic drawing showing the relative size of particles during steps of one embodiment of the method for separating condensable vapors.

FIG. 8B depicts a diagram of an illustrative method (600) for separating condensable vapors from gases to form a solid. Step 602 is passing a process stream (112 of FIG. 6) that includes carbon dioxide and at least one carrier gas through a bed of particles which are located in a first chamber of a particle bed vessel, the bed of particles having a portion of solid particles and a plurality of conduits for holding cooling substances. Refer to FIG. 6 and FIG. 8A for disclosure of which steps are associated with which portions of the system 100.

Step 604 is fluidizing a portion of the solid particles of the bed, wherein some of the portion of the solid particles (see 122 of FIG. 6) exits the first chamber via a top aperture coupled to a separator or via a side port coupled to the separator; referring to FIG. 8A, in step 604 a carbon dioxide molecule is depicted as having been fluidized and is located within a particle bed vessel; the fluidized carbon dioxide molecule is separated from the particle bed of the particle bed vessel and may then be sorted. In Step (604), the carbon dioxide temperature is relatively warm as compared to the temperature of particles after they have been cooled in the heat exchanger; the carbon dioxide is solid and may be less than −78 degrees Celsius. (Note that the structures of 7A may be used for determining the structures of FIG. 8A).

Step 606 is cooling the at least one carrier gas (see 124 of step 6 which leads towards an opening labeled 'Clean Gas Out'), wherein the at least one carrier gas exits the first chamber via a conduit oriented to transport substances to the separator;

Step 608 is receiving in the separator (see 1000 of step 6, which may be a cyclonic separator or multi-stage cyclonic separator) the portion of the solid particles and the at least one carrier gas; separating, via the separator, the portion of the solid particles from the at least one carrier gas; in Step (608) the system has transported the carbon dioxide, or allowed the carbon dioxide to be transported, to a separator such as a cyclonic separator. The particles may be separated in the cyclonic separator. A multistage cyclonic separator, or multistage separator, may be used to separate particles of different sizes into different groups. For example, in a first stage of a multistage cyclonic separator, particles of a certain diameter may first be sorted out. The different groups may then be sorted and sent to different sectors of the system for processing.

Step 610 is subcooling the portion of the solid particles in the heat exchanger (see 120 of step 6) to a temperature that lowers solid carbon dioxide to a lower temperature; prior to step 610, the particles the particles may be transported to a heat exchanger (step 610a, shown in FIG. 8A). In the diagram, Step (610a) depicts the stream of particles as they traveling towards the heat exchanger. A heat exchanger may be linked to a series of heat exchangers and the particles may be transported through a single heat exchanger or through a series of heat exchangers.

Referring to FIG. 8A, Step (610) depicts the particles being subcooled in a heat exchanger. Subcooling means cooling, or lowering the temperature of a particles which is in its solid state. Note that portions of an amount of carbon dioxide are transported to different sectors of the system. References to portions of carbon dioxide means different amounts of carbon dioxide. Any references to "portions of carbon dioxide" refers to essentially all, but not necessarily 100%, of the carbon dioxide, or other substance. Thus, even if a minor amount of a portion of carbon dioxide is not transported out of the fluidized bed, when essentially all or even most of all of the portion of carbon dioxide is transported, then that is sufficient to qualify as transporting the portion of carbon dioxide. Thus, it is expected that in a multi-step process, some particles are likely to be lost and not transferred to the next sector. For example, a first sector may be the vessel of the fluidized bed, a second sector may be a cyclonic separator, and a third sector may be a heat exchanger. Particles in the heat exchanger may be modified to a specific size or shape, and in some preferred embodiments the carbon dioxide particles that entered with the flue gas or the seed particles, which may also be carbon dioxide are subcooled to less than −140 degrees C. (Note that the use of "or", unless otherwise noted, refers to an inclusive or). By arranging the conditions, such as temperature, pressure, or type of seed particles of the fluidized bed, the sizes and shapes of particles may be controlled.

Step 612 is reinjecting substantially all of the portion of the solid particles in the heat exchanger into the bed of particles of the first chamber of a particle bed vessel 116 so as to desublimate a second portion of carbon dioxide located in the first chamber (see 1002 of FIG. 6 depicted the stream of solid particles as it leaves the heat exchanger and heads towards the bed of particles of the first chamber). Subcooled particles, such as carbon dioxide, are then transported by a conduit via gravity, mechanical conveyor belt, or other mechanisms to the particle bed of the particle bed vessel 116. (Note that subcooling a particle may also be referred to as providing sensible cooling to a particle). Subcooled particles, when in the particle bed, are warmed as they assist with the desublimation of carbon dioxide, such as the desublimation of carbon dioxide deposits on surfaces of cooling conduits of the particle bed vessel or of surfaces of the particle bed vessel or other surfaces of the particle bed vessel which lead to "fouling" and decreased efficiency of the system. The particle diameter, such as the particles which were injected from the heat exchanger, may increase as carbon dioxide may deposit onto or combine with the subcooled carbon dioxide.

Figure 8C:
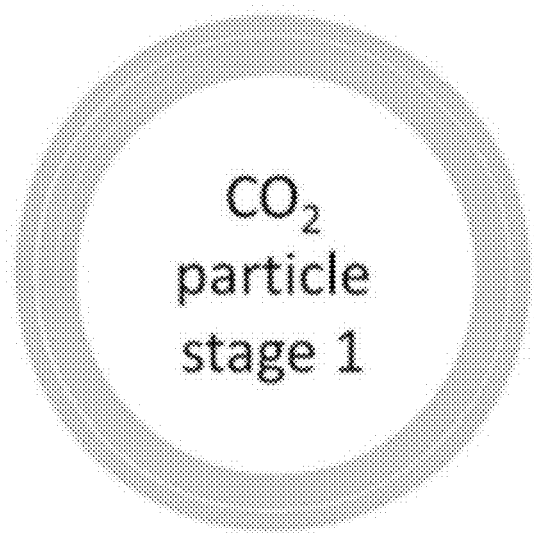
Figure 8C:
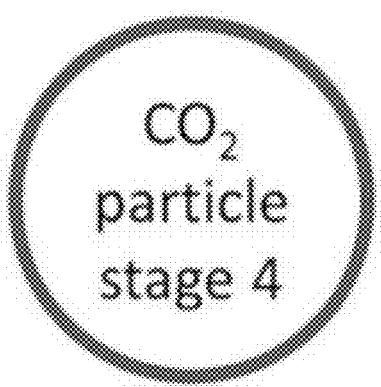
Figure 8C:
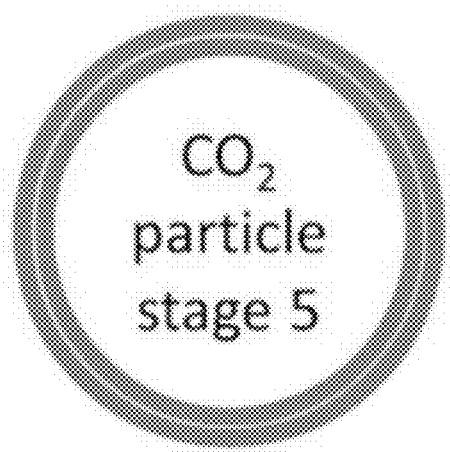

Referring to FIG. 8C the relative sizes of carbon dioxide particles are depicted. The sizes are not too scale but can be used to visualize the relative size of the carbon dioxide particles at different stages of the method. Stage 1 refers to a particle in step 604 of FIG. 8A-note that the diameter of the particle is larger at this stage compared to stage 4 and 5. Carbon dioxide or other substances have been deposited onto the particle or collided and combined with the particle after interacting with the fluidized bed, which is depicted in the drawing as a relatively denser gradient of particles near the bottom of the particle bed vessel; stage 4 refers to step 612 of FIG. 8A in which particles have been subcooled to less than −140 deg C. Stage 5 refers to step 604 shown in FIG. 8A.

In FIG. 8A, a vertical arrow is shown with the label "Gas with condensable carbon dioxide." Referring to FIG. 8A and other embodiments, such as the embodiments depicted in the figures with a vertical arrow showing the flow of gas with condensable carbon dioxide, the actual location where gas with condensable carbon dioxide is inputted into the vessel with the fluidized bed may vary and may not necessarily be coming from the bottom of the vessel. Additionally, in some embodiments, the rate which the gas with condensable carbon dioxide enters the vessel may be continuous or may be not continuous.

Figure 9:
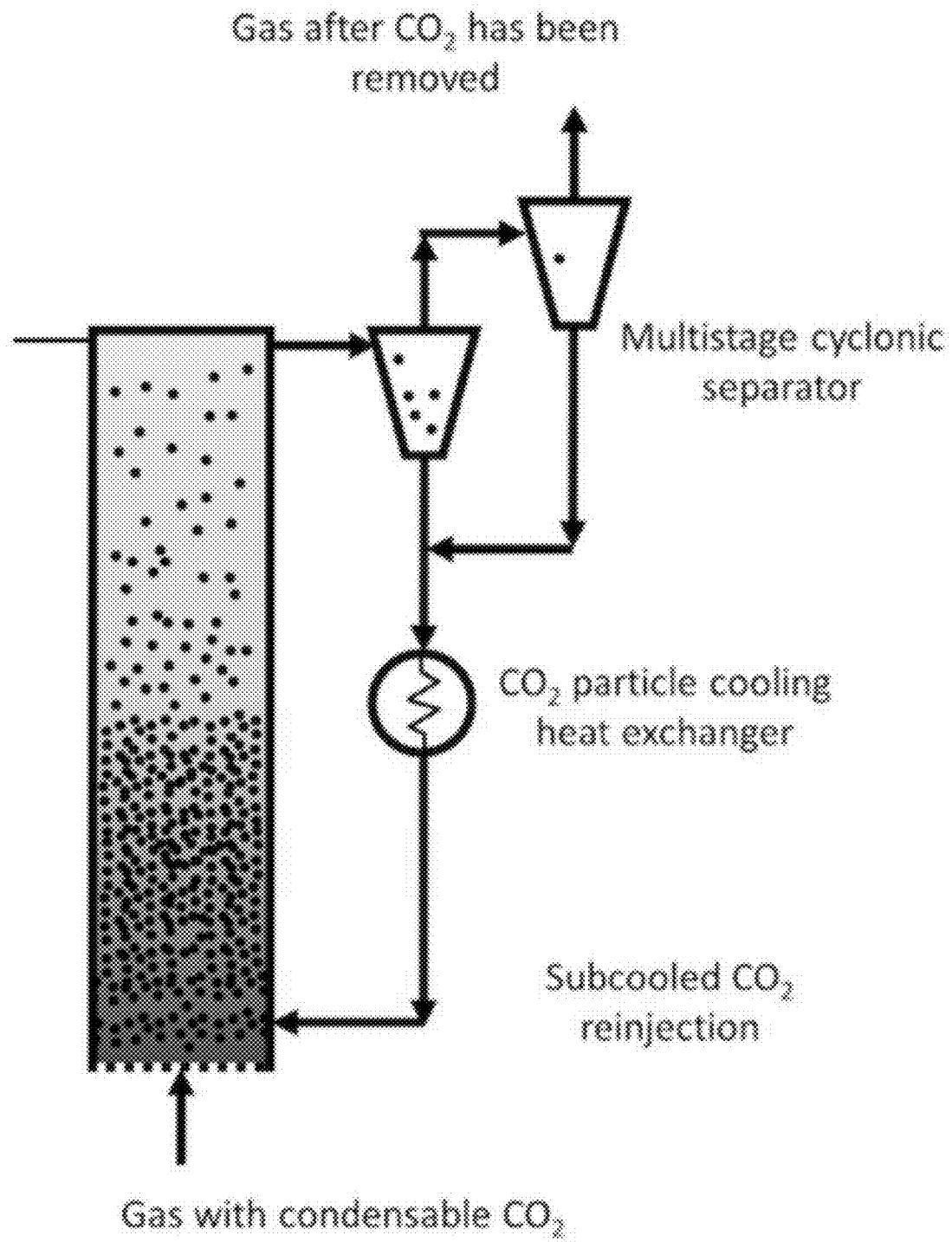
FIG. 9 is a schematic diagram of a system with a multi-stage cyclonic separator.

FIG. 9 depicts the system with a multi-stage cyclonic separator, which may allow for additional sorting of the particles and may have one or more compartments or one or more conduits for storing and transporting particles which have been grouped by size, charge, or other measurable attribute.

Figure 10:
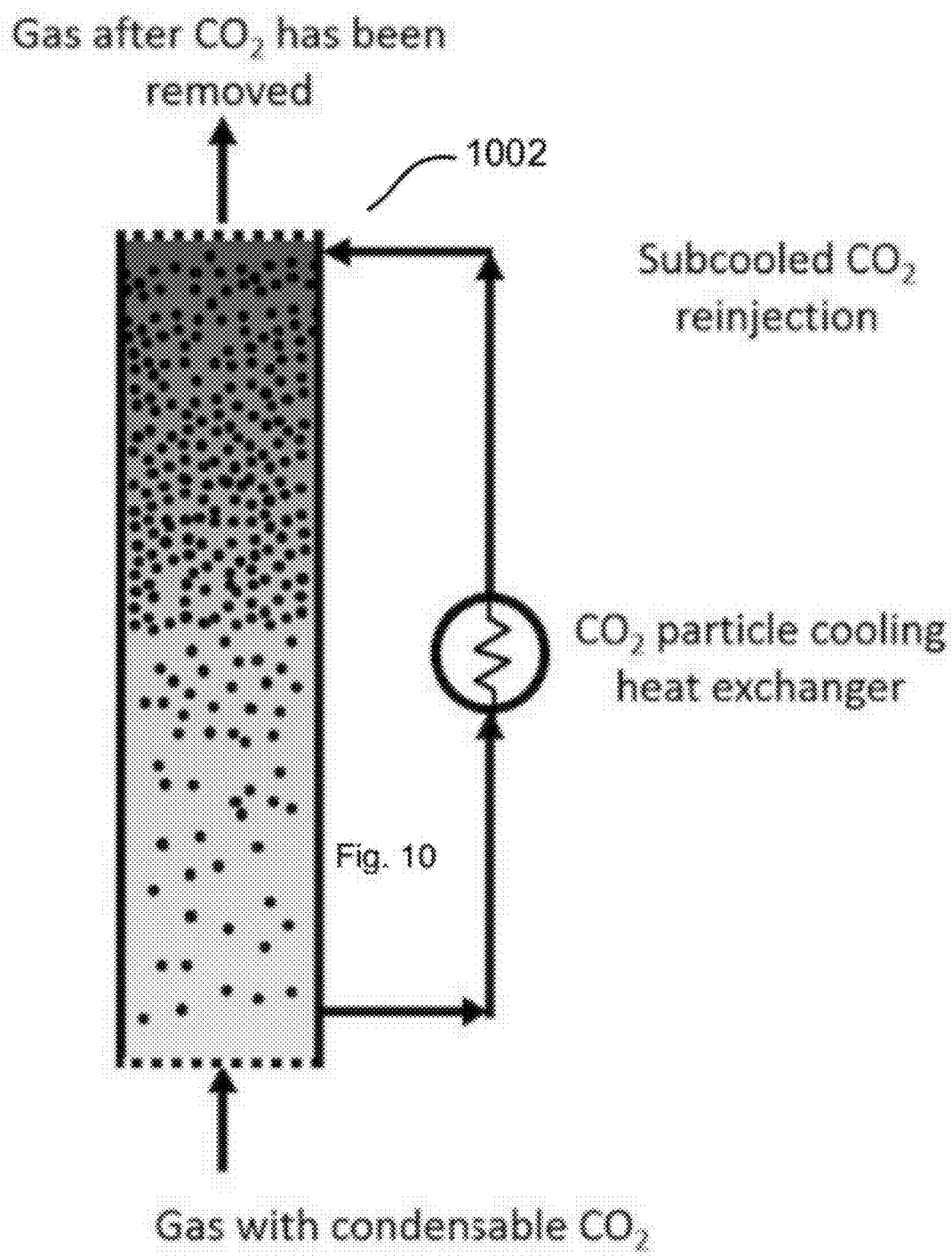
FIG. 10 is a schematic diagram depicting a system with some of the same features as the system depicted in FIG. 7A.

In FIG. 10, subcooled particles, such as subcooled carbon dioxide, enter the vessel with the fluidized bed at a location that is above the fluidized bed. In some embodiments the entry of subcooled particles 1002, such as carbon dioxide, may occur at any location above the fluidized bed; in other embodiments the location may be at the top half of the chamber which houses the fluidized bed; in other embodiments the location may be at the top third of the chamber which houses the fluidized bed; in other embodiments the location may be at the top tenth of the chamber which houses the fluidized bed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for separating condensable vapors from gases to form a solid, comprising:
providing a bed of particles located in a first chamber;
providing a plurality of conduits positioned inside the first chamber;
providing a separator for separating particles;
providing a top aperture coupling the first chamber with the separator or a side port coupling the first chamber with the separator;
providing a conduit oriented to transport substances from the first chamber to the separator;
providing a heat exchanger;
passing a process stream that includes carbon dioxide and at least one carrier gas through the bed of particles located in the first chamber, the bed of particles comprising a portion of solid particles and the plurality of conduits for holding cooling substances;
fluidizing a portion of the solid particles of the bed, wherein some of the portion of the solid particles exits the first chamber via the top aperture into the separator or via a side port into the separator;
cooling the at least one carrier gas, wherein the at least one carrier gas exits the first chamber via the conduit oriented to transport substances to the separator;
receiving in the separator the portion of the solid particles and the at least one carrier gas;
separating, via the separator, the portion of the solid particles from the at least one carrier gas;
sending the portion of the solid particles to the heat exchanger located outside of the first chamber;
subcooling the portion of the solid particles in the heat exchanger; and,
reinjecting all of the portion of the solid particles in the heat exchanger into the bed of particles of the first chamber so as to desublimate a second portion of carbon dioxide located in the first chamber.

2. The method of claim 1, wherein the process stream consists of solid carbon dioxide and gaseous N2.

3. The method of claim 1, wherein the bed of particles comprises solid particles selected from the group consisting of solid carbon dioxide, metal particles, salts, seed particles, and combinations thereof.

4. The method of claim 1, the process stream comprising gaseous carbon dioxide and at least one carrier gas selected from the group consisting of N2, CH4, syngas, H2, CO, argon, oxygen, and combinations thereof.

5. The method of claim 1, a pressure within the bed of particles being in a range from either atmospheric pressure to 17 psi or from atmospheric pressure to 7 psi, wherein the receiving in a separator the portion of the solid particles further comprises separating the solid particles into a plurality of groups of solid particles, sending at least one of the plurality of the groups of solid particles to a location for further processing, and sending at least one of the plurality of the groups of solid particles to a heat exchanger.

6. The method of claim 1, wherein the separator is either a single-stage cyclonic separator or multistage cyclonic separator.

7. The method of claim 1, wherein a temperature within the bed of particles is lowered to less than −78° C. and wherein the step of sending to the separator further comprises sending a portion of the solid particles to a second cyclonic separator for further processing of the solid particles, sending a portion of the solid particles from the cyclonic separator to the heat exchanger, and sending the remainder of the solid particles from the second cyclonic separator to a location for further processing.

8. The method of claim 1, wherein the bed of particles includes particles having an average particle size in a range from 0.05 mm to 20 mm, and wherein the step of subcooling decreases the temperature of the solid particles to below −140° C.

9. The method of claim 1, wherein the bed of particles includes particles having an average particle size in a range from 0.05 mm to 12 mm, and wherein the step of subcooling decreases, on average, the temperature of solid particles by at least 35 degrees Celsius.

10. The method of claim 8, wherein impingement of fluidized particles on a surface of a conduit the first chamber removes at least a portion of condensed solid buildup from the surface of the conduit of the first chamber.

11. The method of claim 9, wherein the step of reinjecting all of the portion of the solid particles in the heat exchanger into the bed of particles of the first chamber is performed at a steady state in which a rate of buildup of condensed solid on the interior surface of the first chamber is approximately the same as a rate of removal of condensed solids therefrom by impingement of the fluidized particles on the interior surface of the first chamber.

12. The method of claim 1, wherein the step of subcooling in the heat exchanger further comprises contacting the portion of the solid particles with a chilled pelletizing head, deforming the solid particles, and breaking the solid particles into uniform pieces.

13. The method of claim 12, wherein the step of breaking the solid particles further consists of breaking the solid particles into spheroid pieces.

14. The method of claim 12, wherein the step of breaking the solid particles further comprises breaking the solid particles into cylindrical pieces with porosity less than 70% and specific gravity between 1.2 and 1.5.

15. The method of claim 12, further comprising compressing, in a first sector of the heat exchanger, the solid carbon so that the carbon dioxide has a porosity of less than 55% and a specific gravity between 0.7 and 1.5 and the step of compressing occurs, in a second sector of the heat exchanger, simultaneously with the step of breaking the solid particles.

16. A method for separating condensable vapors from gases to form a solid, comprising:
cooling a process stream that includes condensable vapors using one or more up-stream heat exchangers prior to passing the process stream through a process stream inlet of a particle bed vessel;
passing the process stream that includes carbon dioxide and at least one carrier gas through a bed of particles of a particle bed vessel, the bed of particles comprising a plurality of solid particles consisting essentially of a plurality of solid particles selected from the group consisting of sulfur dioxide, sulfur trioxide, carbon dioxide, water, nitrogen dioxide, and nitric oxide and a plurality of conduits for holding cooling substances;
fluidizing a portion of the solid particles of the bed, wherein some of the portion of the solid particles exits the first chamber via a top aperture coupled to a multi-stage cyclonic separator or via a side port coupled to the multi-stage cyclonic separator;
cooling the at least one carrier gas, wherein the at least one carrier gas exits the first chamber via a conduit oriented to transport substances to the multi-stage cyclonic separator;
receiving in the multi-stage cyclonic separator the portion of the solid particles and the at least one carrier gas;
separating, via the multi-stage cyclonic separator, the portion of the solid particles from the at least one carrier gas;
separating, via the multi-stage cyclonic separator, the portion of the solid particles into at least three groups based on size;
removing, via the multi-stage cyclonic separator, the at least one carrier gas via a gas outlet of the multi-stage cyclonic separator;
sending at least one group of the portion of the solid particles to a heat exchanger located outside of the first chamber;
subcooling the portion of the solid particles in the heat exchanger to a temperature that lowers solid carbon dioxide to a lower temperature; and,
reinjecting all of the portion of the solid particles in the heat exchanger into the bed of particles of the first chamber so as to desalinate a second portion of carbon dioxide located in the first chamber.

17. An apparatus for separating condensable vapors from gases to form a solid comprising
a particle bed vessel comprising a first chamber housing a fluidized bed comprising a bed of solid carbon dioxide particles;
a multi-stage cyclonic separator configured to separate gases from solid particles and to separate the solid particles based on size;
a heat exchanger, a sorter for grouping the solid particles of a uniform size into a plurality of separate compartments, and a compressor for compressing the solid particles to a specific gravity between 0.5 and 1.5;
an input conduit for transporting the solid carbon dioxide particles to the heat exchanger connecting the first chamber and the heat exchanger; and,
an output conduit for transporting subcooled solid carbon dioxide particles to the first chamber and connecting the first chamber and the heat exchanger.

18. The apparatus of claim 17, the bed of particles consisting essentially of particles having an average particle size in a range from 0.2 mm to 1 mm and the output conduit being positioned at an angle to allow gravitational force to actuate the transporting of the subcooled solid carbon dioxide particles to the first chamber, the input conduit for transporting the solid carbon dioxide particles to the heat exchanger connecting the first chamber and the heat exchanger being positioned so as to transport the solid carbon dioxide particles into an inner chamber of the heat exchanger, wherein the point of contact between the inner chamber and the input conduit is located between the upper third of heat exchanger.

19. The apparatus of claim 17, the heat exchanger being configured to subcool the solid carbon dioxide particles via direct contact heat exchange with a refrigerant released from a refrigerant dispenser coupled with the heat exchanger and the output conduit comprising a mechanically-operable conveyor for transporting the subcooled solid carbon dioxide particles to the first chamber, the mechanically-operable conveyor comprising a cooling tube for lowering the temperature of the carbon dioxide by at least one degree Celsius.

20. The apparatus of claim 17, wherein the multi-stage cyclonic separator further comprises at least 200 aperture-defining portions and wherein the multi-stage cyclonic separator is configured to separate gases from the solid particles and to separate the solid particles into at least four compartments based on size and wherein the heat exchanger is a tube heat exchanger configured to mechanically convey the solid carbon dioxide particles through a plurality of tubes.

\* \* \* \* \*